United States Patent
Maeno

(10) Patent No.: US 7,873,694 B2
(45) Date of Patent: Jan. 18, 2011

(54) INFORMATION SYSTEM MANAGEMENT UNIT

(75) Inventor: Yoshiharu Maeno, Tokyo (JP)

(73) Assignee: NEC Corporation, Tokyo (JP)

( * ) Notice: Subject to any disclaimer, the term of this patent is extended or adjusted under 35 U.S.C. 154(b) by 736 days.

(21) Appl. No.: 11/815,587

(22) PCT Filed: Jan. 30, 2006

(86) PCT No.: PCT/JP2006/301460

§ 371 (c)(1),
(2), (4) Date: Aug. 6, 2007

(87) PCT Pub. No.: WO2006/095506

PCT Pub. Date: Sep. 14, 2006

(65) Prior Publication Data
US 2009/0210520 A1 Aug. 20, 2009

(30) Foreign Application Priority Data
Feb. 10, 2005 (JP) .............................. 2005-034273

(51) Int. Cl.
G06F 15/173 (2006.01)
(52) U.S. Cl. ................... 709/203; 709/223; 709/221; 370/230
(58) Field of Classification Search ............... 709/221, 709/223, 224; 370/230
See application file for complete search history.

(56) References Cited

U.S. PATENT DOCUMENTS

| | | | | |
|---|---|---|---|---|
| 7,349,340 B2* | 3/2008 | Sahai et al. | ................. | 370/235 |
| 7,421,500 B2* | 9/2008 | Talwar et al. | ................ | 709/227 |
| 7,602,711 B2* | 10/2009 | Liu | ............................ | 370/230 |
| 2003/0055920 A1* | 3/2003 | Kakadia et al. | ............. | 709/220 |
| 2005/0198261 A1* | 9/2005 | Durvasula et al. | ........... | 709/224 |
| 2005/0289272 A1* | 12/2005 | Masuoka et al. | ............ | 710/260 |

OTHER PUBLICATIONS

Tomoko Itao et al., "Tekiogata Networking Service Kankyo DANSE", The Transactions of the Institute of Electronics, Information and Communication Engineers, 1999, vol. J82-B, No. 5, pp. 730 to 739, particularly, pp. 731 to 732, "Coordination Shori Gaiyo", p. 733, "3.2 Daitaian no Seisei", p. 734, "4.3 Kino Unit ni yoru Daitai NR no Tansaku", p. 736, "5.2.1 Tansaku Joken Henko Policy".

He, L. et al., 'Hybrid performance-based workload management for multiclusters and girds' In: Software, IEE Proceedings, IEE, Oct. 7, 2004, vol. 151, Issue 5, pp. 224 to 231.

* cited by examiner

Primary Examiner—Ario Etienne
Assistant Examiner—El Hadji Sall
(74) Attorney, Agent, or Firm—Sughrue Mion, PLLC

(57) ABSTRACT

Operational-policy storage means (115) stores therein operational policy to be applied in information systems (103). Operational-policy execution means (113) applies the operational policy. Information-system classification means (114) judges a similar information system (103) based on the application and service level thereof. If an operational policy is input from a console (118), the operational policy is verified using an information-system (103) judged as a similar information system by the information-system classification means (114), to assure the validity of the operational policy.

27 Claims, 20 Drawing Sheets

FIG. 4

| INFORMATION SYSTEM IDENTIFIER | CLIENT IDENTIFIER | APPLICATION | SERVICE LEVEL | COMPUTER RESOURCE IDENTIFIER | NETWORK RESOURCE IDENTIFIER | APPLICATION IDENTIFIER | DATA RESOURCE IDENTIFIER |
|---|---|---|---|---|---|---|---|
| S01 | C001 | CTI | LEVEL 2 | SERVER1 SERVER2 SERVER3 | SW UNIT 1 FW UNIT 1 | CTI | CTI DATA |
| S02 | C002 | CTI | LEVEL 2 | SERVER4 SERVER5 | SW UNIT 2 VPN UNIT 1 | CTI | CTI DATA |
| S03 | C002 | CTI | LEVEL 1 | SERVER6 SERVER7 SERVER8 SERVER9 | SW UNIT 3 LB UNIT 1 FW UNIT 2 | CTI | CTI DATA |
| S04 | C003 | CRM | LEVEL 1 | SERVER10 SERVER11 SERVER12 SERVER13 | SW UNIT 4 RT UNIT 1 FW UNIT 3 | CRM | CRM CLIENT ANALYSIS LIBRARY |

| POLICY IDENTIFIER | OPERATIONAL POLICY IDENTIFIER | IGNITION RECORD (TIMES) | SERVICE LEVEL IMPROVEMENT RECORD (TIMES) | STATUS |
|---|---|---|---|---|
| P01 | REFER TO FIG. 6 | 0 | 0 | UNDER VERIFICATION |
| P02 | REFER TO FIG. 7 | 0 | 0 | UNDER VERIFICATION |

| APPLICATION | SERVICE LEVEL | TARGET VALUE |
|---|---|---|
| CTI | 2 | RESPONSE TIME = 4 SECONDS |
| CTI | 1 | RESPONSE TIME = 2 SECONDS |
| SFA | 2 | NUMBER OF SERVERS = min.(NUMBER OF TERMINALS/50, 2) |
| SFA | 1 | NUMBER OF SERVERS = min.(NUMBER OF TERMINALS/50, 20) |
| CRM | 2 | EXTERNAL STORAGE UNIT CAPACITY = min.(NUMBER OF CLIENTS/1000, 10)GByte |
| CRM | 1 | EXTERNAL STORAGE UNIT CAPACITY = min.(NUMBER OF CLIENTS/1000, 1000)GByte |

117

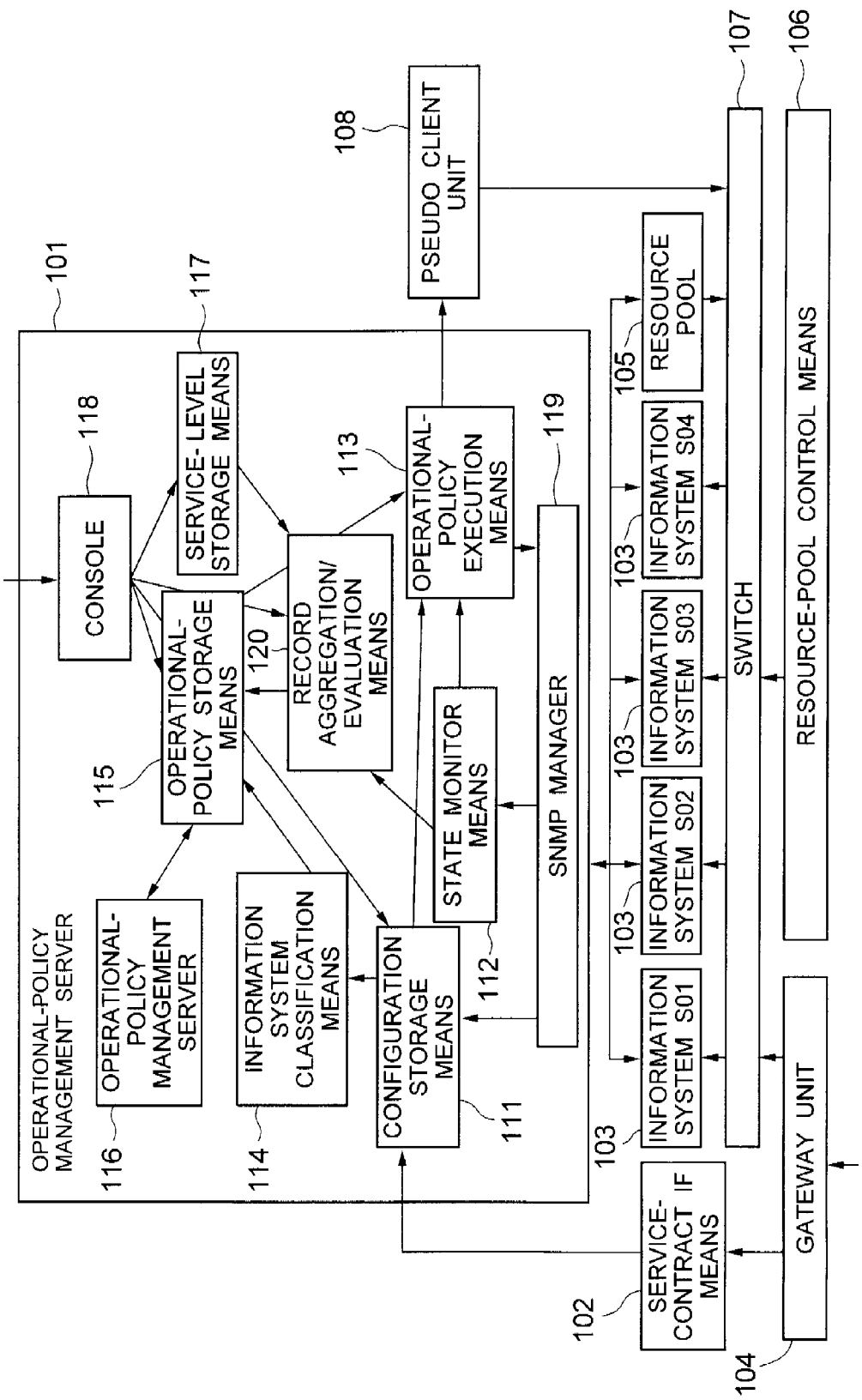

INFORMATION SYSTEM MANAGEMENT UNIT

FIELD OF THE INVENTION

The present invention relates to an information-system management unit and, more particularly, to an information-system management unit which manages an information system by using operational policies thereof.

BACKGROUND ART

An information system is known wherein setting of the configuration is changed by using an operational policy thereof. The technique for applying the operational policy to the information system is described in, for example, Patent Publication Nos. JP-2002-244870A, JP-1999-250153A, JP-2003-248647A, JP-2002-111729A. FIG. 19 shows the configuration of a system-management support unit described in Patent Publication No. JP-2002-244870A. This unit includes a distributed-system management server 208 for operating the service thereof, a job execution server 204, an application server 206, and a database 201.

FIG. 20 shows the data and program stored in the job execution server 204. Log information 241 and log format information 242 respectively store therein log information of the job execution server 204 and log format information defining the format of the log information. Job execution rule (execution policy) 243 stores therein optimizing policies forwarded from the distributed-system management server 208. The job execution section 244 is a program for performing a job based on the demand forwarded from the application server. The database management section 245 is a program for performing storage of data in the database 201, as well as update and read-out of the data.

The log information acquisition section 246 is a program which performs storage of commands etc. executed by the job execution server 204 as the log information in the log information 241, and forwards the log information and log format information based on the demand from the distributed-system management server 208. The communication processing section 247 is a program for communicating with other application servers 206, the job execution server 204, and the distributed-system management server 208. A job 248 is a program which performs a variety of jobs according to the demand from an application server 206.

In the job execution policy 243, the conditions for controlling the execution sequence of the jobs in the job execution server 204 and the applications in the application server 206, or controlling the execution server 204 accessed from the application servers 206 are set as a plurality of job execution policies. The job execution section 244 collects log information generated by execution of a job 248 or application from each server, and if the collected log information satisfies a condition, allows the job execution policy matched with this condition to be performed. In the description of Patent Publication No. JP-2002-244870A, since execution of a job 248 or application is determined based on the log information in this way, it is possible to satisfy the demand of the services which change day by day, and thus it is possible to operate the information system in an optimum way.

In Patent Publication No. 1999-250153A, a workflow supporting system is described which automatically synthesizes a rule based on the history information of a job started manually due to absence of the rule. In this workflow supporting system, the user can manually start a job via a job injection interface by using a method deviated from the rule stored therein. Based on the rule history and connection information stored therein, the new rule including this job started with the manual operation is automatically synthesized by an automatic rule synthesis section, and is stored in a rule base. Thus, a rule is automatically synthesized based on the way of case example manually executed, and thereafter, a similar work flow can be automatically performed.

Patent Publication No. JP-2003-248647A describes a technique for automatically determining the priority of a plurality of pieces of information relating to an electronic mail for transmitting the same to users or system. In this technique, a classifier is used which can explicitly or implicitly learn so as to determine the priority or priority order of one or more of received message according to learned importance for the users. In order to manage the information for which the priority was determined, a graphical user interface is provided. This interface allows the system to be personalized with ease according to the request from the user specifying the way in which the message is to be received and processed by the user.

Patent Publication JP-2002-111729A describes a policy base management system in which a policy currently operated in a router, i.e., device to be managed in a network, is adjusted in an optimum way in real time. The policy base management system includes policy applying means for applying the policy information distributed from the management unit to a managed unit to control the traffic, policy evaluation means to evaluate the policy under application based on the policy evaluation information distributed from the management unit, and policy adjustment means for dynamically adjusting the policy under employment based on the policy adjustment information distributed from the management unit and the evaluation result by the policy evaluation means.

DISCLOSURE OF THE INVENTION

Problems to be Solved by the Invention

In the technique described in Patent Publication No. JP-2002-244870A, the job execution policy 243 is fixed and thus it is the requisite that the validity and optimality be verified beforehand. More specifically, there is no description that the job execution policy 243 is rendered versatile and improved based on the configuration or environment of the system where the application is executed. Therefore, there arises a problem that if the configuration of the system is significantly changed, or if the policy is to be applied to another system, it is impossible to verify whether or not the job execution policy is valid.

In the technique described in Patent Publication No. 1999-250153A, since a new rule is automatically synthesized based on the job supplied manually by the user, a perfect automation without manpower is not achieved. Since there is no case example automatically synthesized by another system or improvement judged statistically from the actual achievement of the execution result of the job supplied, verification of the validity or versatility of the rule after the automated synthesis is not performed. There is a problem that a bug may exist in a job provided manually by a user, and it is not possible to avoid a risk that the bug may incur a failure in the system.

In the technique described in Patent Publication JP-2003-248647A, it is necessary to transmit and receive a large number of electronic messages during the learning process before it determines the priority from the learned importance, thereby necessitating a long-time learning period. During the learning process for determining the priority, there may be a possibility of determination of inadequate priority or transmission of inadequate electronic messages. Accordingly, the judgment of the validity of the priority thus determined is conducted by the user via a graphical user interface, and thus there arises a problem that it is not possible to automatically judge the validity.

In the technique described in Patent Publication JP-2002-111729A, since the parameters and thresholds included in the policy are dynamically adjusted for each state of the traffic, a versatile policy applicable to a variety of states of the traffic or to network devices having different characteristics cannot be obtained. For this reason, if the policy is to be diverted to another system, it is necessary to adjust again the parameters and thresholds in the policy. Therefore, there is a problem that discard of a packet may occur, and the adjusted policy cannot be diverted to a system in a service level, which does need the policy.

It is an object of the present invention to solve the problems encountered in the above conventional techniques, and to provide information-system management unit, method and program, which are capable of reducing the verification time length during verification of an operational policy. It is another object of the present invention to provide information-system management unit, method and program, which are capable of improving the operational policy and increasing the number of types of information systems to which the operation policies can be applied.

Means for Solving the Problems

The present invention provides a information-system management unit for managing a plurality of information systems for which a service to be provided and a service level specifying a guarantee level of the service are specified, including: operational-policy storage means for storing therein an operational policy having a description including a service name, a service level, an operation to be performed to resources in the information systems, and a condition for performing the operation; configuration storage means for storing therein configuration information including a service name and a service level of each of the information systems; information system extraction means for extracting at least one of the information systems having a service name and a service level corresponding to the service name and the service level of the operational policy, by referring to configuration information stored in the configuration storage means; operational-policy execution means for applying to the extracted information system a corresponding operational policy, to store record data obtained by the applying; and verification means for verifying a validity of the applied operational policy based on the stored record data.

The present invention provides an information-system management method using a server for managing a plurality of information systems for which a service to be provided and a service level specifying a guarantee level of the service are specified, including the steps of: the server storing in operational-policy storage means an operational policy having a description including a service name, a service level, an operation to be performed to resources in the information systems, and a condition for performing the operation; the server storing in configuration storage means configuration information including a service name and a service level of each of the information systems; the server extracting at least one of the information systems having a service name and a service level corresponding to the service name and the service level of the operational policy, by referring to configuration information stored in the configuration storage means; the server applying to the extracted information system a corresponding operational policy, to store record data obtained by the applying; and the server verifying a validity of the applied operational policy based on the stored record data.

The present invention provides a program for an information-system management unit managing a plurality of information systems for which a service to be provided and a service level specifying a guarantee level of the service are specified, the program allowing the information-system management unit to perform the processing of: storing in operational-policy storage means an operational policy having a description including a service name, a service level, an operation to be performed to resources in the information systems, and a condition for performing the operation; storing in configuration storage means configuration information including a service name and a service level of each of the information systems; extracting at least one of the information systems having a service name and a service level corresponding to the service name and the service level of the operational policy, by referring to configuration information stored in the configuration storage means; applying to the extracted information system a corresponding operational policy, to store record data obtained by the applying; and verifying a validity of the applied operational policy based on the stored record data.

The information-system management unit, method and program of the present invention verify the operational policy by using the information system having the same service name and the same service level. In general, the number of servers, etc. differ between different information systems. Even in such a case, since the present invention performs verification using the information systems having a service name and a service level which are same as the service name and the service level, respectively, of a target operational policy, a large number of information systems can be used for verification, thereby reducing the time length needed for verification of the operational policy.

In the information-system management unit of the present invention, a configuration may be employed wherein the operational-policy execution means performs the operation described in the corresponding operational policy if the extracted information system satisfies the condition described in the corresponding operational policy. In the information-system management method of the present invention, a configuration may be employed wherein the server performs the operation described in the corresponding operational policy if the extracted information system satisfies the condition described in the corresponding operational policy. In the program of the present invention, a configuration may be employed wherein the information-system management unit is allowed to perform the operation described in the corresponding operational policy if the extracted information system satisfies the condition described in the corresponding operational policy. By employing these configurations, the operation applied to the resources can maintain the service level.

In the information-system management unit of the present invention, a configuration may be employed wherein the operational-policy execution means monitors a change of state of the extracted information system between before and after the execution, and stores therein a number of times of condition satisfaction and a number of times of service improvement obtained by the execution as the record data. In the information-system management method of the present invention, a configuration may be employed wherein record data includes a number of times of condition satisfaction and a number of times of service improvement obtained by the execution, which are obtained by monitoring a change of state of the extracted information system between before and after the execution, and stores therein. In the program of the present invention, a configuration may be employed wherein record data includes a number of times of condition satisfaction and a number of times of service improvement obtained by the execution, which are obtained by monitoring a change of state of the extracted information system between before and after the execution, and stores therein. By employing these configurations, the number of times of improvement is divided, for example, by the number of times of condition satisfaction, whereby the ratio of the contribution to maintaining the service level can be obtained.

In the information-system management unit of the present invention, a configuration may be employed wherein the verification means judges the extracted operational policy as a valid operational policy, if a relationship between the number of times of condition satisfaction and the number of times of improvement satisfies a specific condition. In the information-system management method of the present invention, a configuration may be employed wherein the verification step judges the extracted operational policy as a valid operational policy, if a relationship between the number of times of condition satisfaction and the number of times of improvement satisfies a specific condition. In the program of the present invention, a configuration may be employed wherein the verification processing judges the extracted operational policy as a valid operational policy, if a relationship between the number of times of condition satisfaction and the number of times of improvement satisfies a specific condition. By employing these configurations, if the number of times of condition satisfaction is above a specific threshold, and the ratio of contribution to maintaining the service level is above a specific ratio, for example, the operational policy is judged as an operational policy valid to contribute to maintaining the service level.

In the information-system management unit of the present invention, a configuration may be employed wherein the operational-policy storage means, upon receiving an operational policy specifying a service to be provided and specifying no service level thereof, stores an operational policy specifying the specified service and a lowest service level among service levels designated for services same as the specified service, and wherein if the verification means judges that the stored operational policy is valid, the operational-policy storage means iteratively replaces the stored operational policy by another operational policy specifying the specified service and a higher service level. A configuration may be employed wherein the information-system management method of the present invention further includes the step of the server, upon receiving an operational policy specifying a service to be provided and specifying no service level thereof, storing an operational policy specifying the specified service and a lowest service level among service levels designated for the specified service, wherein if the stored operational policy is judged valid, the server iteratively replaces the stored operational policy by another operational policy specifying the specified service and a higher service level. In the program of the present invention, a configuration may be employed wherein the information-system management unit is further allowed to perform, upon receiving an operational policy specifying a service to be provided and specifying no service level thereof, storing an operational policy specifying the specified service and a lowest service level among service levels designated for the specified service, and iteratively replacing the stored operational policy by another operational policy specifying the specified service and a higher service level if the stored operational policy is judged valid. By employing these configurations, the operational policy can be verified while raising the service level thereof, whereby the service level at which the operational policy can be applied is automatically judged.

A configuration may be employed wherein the information-system management unit of the present invention further includes policy creation means for reading from the operational-policy storage means a plurality of operational policies specifying a common service and a common service level and judged as valid operational policies by the verification means, to create at least one new operational policy based on the read operational policies. A configuration may be employed wherein the information-system management method of the present invention further includes the step of the server reading from the operational-policy storage means a plurality of operational policies specifying a common service and a common service level and judged as valid operational policies by the verification means, to create at least one new operational policy based on the read operational policies. In the program of the present invention, a configuration may be employed wherein the information-system management unit is further allowed to perform reading from the operational-policy storage means a plurality of operational policies specifying a common service and a common service level and judged as valid operational policies by the verification processing, to create at least one new operational policy based on the read operational policies. By employing these configurations, a new operational policy can be created from a plurality of operational polices which are assured by the verification to have a validity, whereby an operational policy effective to maintain the service level can be created. In addition, since the new policy is created from the operational policies already verified to have the validity, the number and the number of types of information systems to which the operational policies can be applied is increased.

A configuration may be employed wherein the information-system management unit of the present invention further includes policy creation means for creating a new operational policy based on a specific operational policy verified as a valid operational policy by the verification means, and another operational policy stored in the operational-policy storage means, specifying a service and a service level same as the service and the service level, respectively, specified in the specific operational policy and verified as a valid operational policy by the verification means. A configuration may be employed wherein the information-system management method of the present invention further includes the step of server creating a new operational policy based on a specific operational policy verified as a valid operational policy by the verification means, and another operational policy stored in the operational-policy storage means, specifying a service and a service level same as a service and a service level, respectively, specified in the specific operational policy and verified as a valid operational policy by the verification means. In the program of the present invention, a configuration may be employed wherein the information-system management unit is further allowed to perform creating a new operational policy based on a specific operational policy verified as a valid operational policy by the verification means, and another operational policy stored in the operational-policy storage means, specifying a service and a service level same as a service and a service level, respectively, specified in the specific operational policy and verified as a valid operational policy by the verification means.

In the information-system management unit of the present invention, a configuration may be employed wherein the verification means compares record data of an operational policy verified as a valid operational policy by the verification means and record data of the new operational policy created by the policy creation means (116), to judge whether or not the new operational policy is valid based on result of the comparison. A configuration may be employed wherein the information-system management method of the present invention further includes the step of the server comparing record data of an operational policy verified as a valid operational policy by the verification means and record data of the new operational policy created by the policy creation means, to judge whether or not the new operational policy is valid based on result of the comparison. In the program of the present invention, a configuration may be employed wherein the information-system management unit is further allowed to perform comparing record data of an operational policy verified as a valid operational policy by the verification processing and record data of the new operational policy created by the policy creation means, to judge whether or not the new operational policy is valid based on result of the comparison. By employing these configurations, if the record data of the newly-created operational policy is superior to the record data of the operational policy verified as valid in the verification, for example, the created operational policy is judged as effective to improve the operational policy.

In the information-system management unit of the present invention, a configuration may be employed wherein the policy creation means interchanges at least one of the operation and the condition between a plurality of the operational policies, to create the new operational policy. In the information-system management method of the present invention, a configuration may be employed wherein the policy creation step interchanges at least one of the operation and the condition between a plurality of the operational policies, to create the new operational policy. In the program of the present invention, a configuration may be employed wherein the policy creation processing interchanges at least one of the operation and the condition between a plurality of the operational policies, to create the new operational policy.

In the information-system management unit of the present invention, a configuration may be employed wherein the policy creation means uses a common description in at least one of the operation and the condition specified of a plurality of operational policies, to create the new operational policy. In the information-system management method of the present invention, a configuration may be employed wherein the policy creation step uses a common description in at least one of the operation and the condition specified of a plurality of operational policies, to create the new operational policy. In the program of the present invention, a configuration may be employed wherein the policy creation processing uses a common description in at least one of the operation and the condition specified of a plurality of operational policies, to create the new operational policy.

EFFECT OF THE INVENTION

In the information-system management unit, method, and program of the present invention, a target operational policy for the verification is verified using the information system having a service name and a service level which are same as the service name and the service level, respectively, of the operational policy. Thus, a large number of information systems can be used for verification, to thereby reduce the time length needed for verification of the operational policy.

BEST MODE FOR CARRYING OUT THE INVENTION

Hereinafter, embodiments of the present invention will be described in detail with reference to the drawing. FIG. 1 shows the configuration of an information-system providing system including an information-system provider server according to a first embodiment of the present invention. The information-system provider server 100 is configured as an outsourcing-service provider center, which provides an information system or vicarious execution of an information system. An outsourcing service provider provides a plurality of client companies (C001 etc.) with a CTI (computer telephony integration) application which supports the service of a contact center, a SFA (sales force automation) application which supports an operating project and management of operating staffs, a CRM (customer relationship management) application which analyzes a customer database, and so on.

The information-system provider server 100 is configured as a computer system operating on a program, and includes an operational-policy management server 101, a service contract interface (IF means) 102, information systems 103, and a gateway unit 104. The gateway unit 104 receives an access from a client company via the Internet N1. The service-contract IF means 102 offers the client company a user interface for specifying the application to be provided and the service level thereof. The information systems 103 each are configured as a system for providing applications. The information-system provider server 100 lends an information system S01 to a client company, for example, client company C001, according to a contract. The operational-policy management server 101 executes operations to a variety of resources in the information systems 103, in order to guarantee the service level decided by the service contract.

Upon receiving the service, client company C001 specifies the application of the information system subject to the outsourcing service contract and the service level thereof, via the gateway unit 104 and service-contract IF means 102. The information-system provider server 100 includes a plurality information systems 103, selects an information system S01 based on the application and service level which are specified, and assigns the information system S01 to the client company C001. The information-system provider server 100 assigns an account to the client company C001 for accessing the assigned information system S01, and allows an access to the information system S01 so that the information system S01 is accessed from the Internet or VPN (virtual private network).

The information-system provider server 100 can accommodate a new service contract with a client company, so long as there is an information system 103 not assigned. After a service contract period expires, the information-system provider server 100 cancels the assignment of information system 103, and prepares for a contract with another client company. For a client company, there is a convenience that the outsourcing service provider offers application resources, computer resource, network resource, and data resource collectively as an information system 103, and that the service level decided by the service contract is guaranteed.

FIG. 2 shows the configuration of the information systems 103. The information systems 103 include: resources 131 including computer resources, network resources, application resources and data resources; and SNMP (simple network management protocol) clients 132 for accessing therethrough the resources. The computer resources, network resources, application resources, and the data resource constituting the resources 131 are allocated with unique resource identifier in advance, and thus can be identified uniquely. It is to be noted that although the SNMP client 132 generally exists for any of the resources to which the resource identifier is assigned, only a single SNMP client 132 is illustrated in FIG. 2 for simplification of the drawing.

The computer resources include a server unit, an operating system operating with the server unit, other platform software, and an external storage means attached to the server unit, etc. The network resources include switching devices (SW), firewall units (FW), the right of use of VPN or VLAN (Virtual AN), a minimum guarantee band on the network path, and the preferential right at the packet transmission. The application resources each include an application program and the license of the application program. The data resources include data used by the applications, such as template, library, and statistics database as well as the license of them.

The resources 131 may include reserve resources. For example, the resources 131 may include a spare server unit as a spare computer resource, which may be used as a backup in case of a failure or for reinforcing the capacity in case of a higher load. Such a spare resource may be the object to borrow and lend among a plurality of information systems 103. For example, when the spare server unit is not used in the information system S01, the spare server unit is temporarily lent to another information system S02 etc, to maintain the operating rate of the resources. This provides an efficient use of the resources 131.

A client company connects to the information system 103 by using an own information terminal. The information terminal of the client company and the information system 103 are connected via the Internet or IP VPN. A personal computer installed in the business location or factory may be used as the information terminal, and a PDA (personal digital assistant) or portable telephone connected to the Internet at an unspecified point may be used as the information terminal. A SOAP protocol (simple object access protocol) may be used for the data communications between the information terminal and the information system 103, and a SIP protocol (session initiation protocol) may be used for voice communications. In such a case, the gateway unit 104 supervises whether or not the communication using these protocols is from a proper client company having the service contract.

FIG. 3 shows the operational-policy management server 101 in a functional block diagram. The operational-policy management server 101 includes configuration storage means 111, condition monitoring means 112, operational-policy execution means 113, information-system classification means (extraction means) 114, operational-policy storage means 115, operational-policy modification means (creation means) 116, service-level storage means 117, a console 118, a SNMP manager 119 and a record aggregation/evaluation means (verification means) 120. The console 118 is configured as an input/output means to input a variety of information or to display a variety of information on a display screen.

The SNMP manager 119 communicates with the SNMP client 132 (FIG. 2) in the information system 103. The SNMP manager 119 accesses MIB (management information base) storing therein the configuration information and state information of each resource of the information system 103 by using an SNMP protocol. MIB of the computer resource and the network resource is stored in a memory of these resources or an external storage means attached thereto. MIB of application resources and data resources is stored in the computer resource in which they are stored. The SNMP manager 119 writes the setting change of the configuration information (set processing of SNMP) on each resource using an SNMP protocol. Moreover, the SNMP manager 119 performs read-out (get processing and trap processing of SNMP) of the configuration information and state information of each resource.

The configuration information and state information of resources differ between types of the resources, such as computer resource, network resource, application resource, and data resource, and are specified in advance as MIB. For example, the MIB of a computer resource includes the configuration information, such as the model name of server unit and version number of the operating system, and the state information such as CPU utilization rate (%) and used memory capacity (MByte). The MIB of a network resource includes the configuration information such as the model name of the switching device and assignment of VLAN, etc., and the state information such as a traffic flow (MByte/s).

The SNMP manager 119 acquires a CPU utilization rate from the MIB of a computer resource, for example, by get processing of the SNMP. The SNP overwrites the information specifying working/backup of the configuration information in the MIB of the spare server unit to change the setting of the server unit, and also writes the configuration information in the MIB of the SW device and FW unit which connect the spare server unit and the gateway unit 104, to thereby change the setting so that the server unit prepared as a reserve resource may be used as a working server.

For the computer resource and network resource, the MIB definition normally standardized is used, which may be extended by the outsourcing service provider if needed. On the other hand, for the application resource and data resource, there is no definition of MIB normally standardized and thus the configuration information and state information peculiar to those are defined. For example, the configuration information, such as service level, priority on the response to a telephone, and the state information, such as the number of concurrent accesses per server unit, are defined as the MIB of the CTI application, which is an application resource.

The configuration storage means 111 further stores therein information on the attribute of the information system 103. FIG. 4 shows the attribute information of the information system 103 stored in the configuration storage means 111. In the same drawing, the "information system identifier" represents the identifier of each information system 103. Four information systems 103 from S01 to S04 are indicated in the example of the figure. The "client identifier" represents the identifier of the client company with which the outsourcing service provider has a service contract. Three client companies from C001 to C003 assigned to each information system 103 are indicated for the information systems S01-S04 in the example of the FIG. 4. A "client identifier" is input by the service-contract IF means 102 or the console 118 based on the contract with the client company.

The "application" and "service level" represent the name of application provided to the client company in accordance with the contract and the specified value of the service level thereof, respectively. The attribute value of these "application" and "service level" is input by the service-contract IF means 102 or console 118 based on the contract with the client company. In the example of FIG. 4, it is shown that the information systems S01-S03 provide the CTI application. Moreover, it is shown that the information systems S01 and S02 provide the CTI application at a service level "2", and that the information system S03 provides the CTI application at a service of "1".

The "service level" is an attribute value which specifies the guarantee level of the service with respect to the application provided to the client company. More specifically, the service level is a guarantee level of the performance or reliability of the application. In the present embodiment, the attribute value of the service level is defined by an integer, wherein a smaller value indicates a higher guarantee level and a larger value indicates a lower guarantee level. For example, with respect to the CTI application, level "2" corresponds to a response time within 5 seconds, and level "1" corresponds to a response time within 3 seconds. Further, with respect to the SFA application, level "2" corresponds to 100 as the maximum number of personal digital assistants to be treated, and level "1" corresponds to 1000 as the maximum number thereof. With respect to the CRP application, level "2" corresponds to 10,000 as the maximum number of customers to be accommodated, and level "1" corresponds to 1,000,000 as the maximum number thereof. The client company specifies service level "1", for example, as a service level which guarantees a higher quality service, to the outsourcing service provider, if the client company needs a high-performance information system, and specifies service level "2", for example, to the outsourcing service provider if the client company does not need such a high-performance information system.

The "computer resource identifier" specifies the resource identifier of the computer unit used by the information system 103. Similarly, the "network resource identifier", "application identifier", and "data resource identifier" each specify the identifier of the resources used by the information system 103. These identifiers are acquired from the resources in the information system 103 by the SNMP manager 119. For example, network resource identifier "SW device 1" represents the switching device of an IEEE802.1 LAN standard, and "RT unit 1" represents IP router unit. "LB unit 1" represents load balancer unit, "FW unit 1" represents firewall unit, and "VPN unit 1" represents the termination unit of VPN.

The condition monitoring means 112 reads the configuration information and state information from the MIB via the SNMP manager 119 and SNMP client 132 (FIG. 2), to supervise the state of resources. The condition monitoring means 112, upon reading the configuration information or state information, refers to the configuration storage means 111, investigates the subject resources for read-out, and reads the information from the subject resources. For example, the condition monitoring means 112, upon reading the model name of the hardware of the server unit in the information system S01, refers to the configuration information stored in the configuration storage means 111, investigates the identifier of the server unit used by the information system S01, and reads out the model name of the hardware, "server 1", "server 2" or "server 3."

Operational policies are applied during operation of the information system 103. An operational policy includes a group of rules which describe a setting procedure of the information system 103 for stabilizing the operation of application and guaranteeing the service level. An operational policy is defined corresponding to the application and the service level thereof. If it is predicted in the information system 103 that guarantee of the service level will be difficult, an operational policy is ignited to change the configuration of the information system 103 for the purpose of improvement of the service level.

For example, if the number of concurrent accesses per server unit increases to raise the load of the computer resources and network resources in the information system S01, an operational policy is ignited whereby a server 3 prepared as a reserve resource is operated as a working server according to the operational policy, thereby reinforcing the capability of the information system S01. Reserve resources are not limited to server units and may include spare ports of a switching device and spare bands. In addition, a setting of the application resource with respect to the priority order on the response to a telephone call may be changed, in order to maintain the service level.

The operational-policy storage means 115 stores therein operational policies to be applied to the information system 103, and the associated information. The console 118 is used for input of an operational policy to be stored in the operational-policy storage means 115. FIG. 5 shows the information stored in the operational-policy storage means 115. In FIG. 5, the "policy identifier" represents the identifier of the operational policy. In the example of FIG. 5, the operational-policy storage means 115 stores therein two operational policies having policy identifiers "P01" and "P02". The "ignition record", "service level improvement record", and "status" will be described later. The operational-policy modification means 116 acquires an operational policy from the operational-policy storage means 115, and executes an improvement processing as detailed later, to improve the operational policy.

FIGS. 6 and 7 exemplify the contents of the operational policy description in FIG. 5. The operational policy is comprised of four parts including policy identification description, configuration information description, state information description, and configuration change description. Among the four constituent parts of the operational policy description, the configuration information description and state information description correspond to the contents of a condition of the policy ignition (IF sentence), and configuration change description corresponds to the contents of execution (THEN sentence) at the time of satisfaction of the condition. The operational policy may include a plurality of descriptions for each of the configuration information description, state information description, and configuration change description.

The policy identification description includes the "application" to which the operational policy is applied and "service level" thereof. The configuration information description represents the condition of configuration information for the operational policy to ignite. The state information description represents the condition of state information for the operational policy to ignite. The policy ignition condition is described by the configuration information description and state information description by using the information which can be read from the MIB via the SNMP manager 119. The composition change description represents the contents of configuration change after the operational policy ignites. The configuration change description includes the contents of setting change of the configuration information, which can be written in the MIB via the SNMP manager 119.

FIG. 8 exemplifies the information stored in the service-level storage means 117. As shown in the FIG. 8, the service-level storage means 117 stores therein a target status value of the information system within the operational-policy management server 101, for a combination of the application to be provided to the client and the service level thereof. These target values can be input via the console 118. In the example of the FIG. 8, a higher quality of service corresponds to a smaller value of the "service level". As to the CTI application, for example, service level "1" corresponds to a smaller response time length and thus a higher quality of service, compared to service level "2".

The target value may be described by an arithmetic operation or function using the state information of the resource included in the MIB accessed via the SNMP manager 119.

For example, if a target value is defined by the number of clients per server, the target value may be defined by: (client number/server number)=20, for example. If the target value is defined by the CPU utilization rate of the server having a maximum CPU utilization rate among the servers, the target value may be defined by: MAX (CPU utilization rate of server 1, CPU utilization rate of server 2, CPU utilization rate of server 3)=70%, for example.

The target value is set for the purpose of management in the operational-policy management server 101, and thus is not the quality of service itself to be offered to the client. For example, suppose that the quality of service to be offered to the client corresponds to service level "2" of the CTI application, which corresponds to a response time within 5 seconds. In such a case, the target value of the state value in the operational-policy management server 101 is set at a response time within 4 seconds, for example. At service level 2, the response time within 4 seconds assures the quality of service provided to the client, while allowing an efficient use of the resources in the outsourcing service provider center.

The operational-policy execution means 113 stores in association each information system 103 and operational policies to be applied to the information system, and executes the operational policies in a corresponding information system 103. The operational-policy execution means 113 supervises the state of the information system 103 via the condition monitoring means 112, and judges whether or not a policy ignition condition specified by the configuration information description and state information description is satisfied in the information system 103. If the operational-policy execution means 113 judges that the policy ignition condition is satisfied, the operational-policy execution means 113 ignites the operational policy and will execute setting change via the SNMP manager 119 according to the configuration change description.

The information-system classification means 114 judges whether or not information systems 103 are analogous based on the "application" and "service level" stored in the configuration storage means 111. Even if the model name of the resources, version number or number of resources in the information system is different between a plurality of information systems, the information-system classification means 114 judges that these information systems are analogous so long as the "application" and "service level" are coincident between them. For example, in FIG. 4, the information-system classification means 114 judges that information system S01 and information system S02 are analogous because both define "application"="CTI" and "service level"="level 2", although both the systems are different in the number of servers currently used, etc.

The operational-policy storage means 115, upon input of a new operational policy from the console 118, sets the "status" of the new operational policy at under verification. The operational policy newly stored in the operational-policy storage means 115 is verified for the validity thereof by a verification operation. The operational polices newly input from the console 118 may include ones in which the application and service level are specified at the time of input, and others in which the application and service level are not specified at the time of input. If the service level is specified, the verification is performed at the service level, for judging "valid" or "invalid". If the service level is not specified, the verification is consecutively performed from a lower service level to a higher service level, for judging the service level at which the operational policy can be applied.

Verification of the operational policy in which the application and service level are specified is performed using an information system 103 which is judged analogous the information system, to which the operational policy is to be applied, by the information-system classification means 114. Each of an information system already assigned to the client company and another information system not assigned to the client company may be used as the information system for verification. If the unassigned information system 103 is used for verification, a pseudo client unit 108 is used. The pseudo client unit 108 stores therein a pattern of demands or jobs issued to the information system actually assigned to the client company, and changes the unassigned information system 103 into an employment state according to the pattern. In the verification, if the operational policy is judged to be able to provide a specified service level of the quality of service, the operational policy is judged valid. On the other hand, if the operational policy is judged to be unable to provide the specific service level of quality of service, the operational policy is judged invalid.

If an operational policy is input in which the service level is not specified, the operational-policy storage means 115 refers to the service-level storage means 117 before storage of the operational policy, and selects the lowest service level of the application to which any operational policy is applied, thereby setting the selected service level for the input operational policy. For example, for the application "CTI application", the "service level 2" is added to the policy identification description (refer to FIG. 6), with reference to the service-level storage means 117 storing therein the information shown in FIG. 8.

Thereafter, at the service level set by the operational-policy storage means 115, the operational policy is verified by a procedure similar to the procedure of the verification of the operational policy in which the application and service level are specified. If it is judged that the operational policy is valid in this verification, the operational-policy storage means 115 changes the service level to a one-step higher service level from the previous service level set in the operational policy. Subsequently, the operational-policy storage means verifies at the changed service level. Such verification is performed until it is judged that the operational policy is invalid at the changed service level, or until the service level achieves a highest service level. This provides the service level at which the operational policy is judged valid. If it is judged by the verification that the operational policy is invalid at the lowest service level, the operational policy is judged invalid.

Record aggregation/evaluation means 120 is used for verification of the operational policy. FIG. 9 shows the record information on the operational policy stored in the record aggregation/evaluation means 120. If the operational-policy execution means 113 ignites the policy for verification, the operational-policy execution means 113 increments the "ignition record" of the thus ignited operational policy stored in the record aggregation/evaluation means 120. Subsequently, the operational-policy execution means 113 refers to the service-level storage means 117, acquires an application in the policy description and the target value corresponding to the service level. After the ignition of policy, the operational-policy execution means 113 acquires, from the condition monitoring means 112, the value before the policy ignition and the value immediately after the execution of the setting change, the value corresponding to the state information in the item of the target value. Thereafter, the operational-policy execution means 113 judges whether the operational policy is valid or invalid for maintaining the service level, and increments the "service level improvement record" if it is judged that the operational policy is valid.

For example, if the operational policy under verification specifies the CTI application and service level 2, the target value is "average response time=4 seconds" (refer to FIG. 8). In this case, the operational-policy execution means 113 acquires the average response time of the information system 103 before the policy ignition, and the average response time of the information system 103 after the setting change implemented by the policy ignition via the condition monitoring means 112. If the average response time before the policy ignition is 5 seconds and the average response time after the setting change execution is 3.5 seconds, it is judged that the average response time of the information system 103 approached the target value. In this case, the operational-policy execution means 113 judges that the ignited operational policy is valid for maintaining the service level, and increments the "service level improvement record" of the operational policy stored in the record aggregation/evaluation means 120.

The record aggregation/evaluation means 120 judges whether or not the operational policy is applicable to the specified service level based on the "ignition record" and "service level improvement record". If the ignition record exceeds 80, for example, the record aggregation/evaluation means 120 calculates (service level improvement record)÷(ignition record), and judges the validity of the operational policy based on the calculated value. If (service level improvement record)÷(ignition record) exceeds 95%, the operational policy is judged valid, and otherwise judged invalid. The criterion of judgment of "valid" or "invalid" may be specified from the console 118. The record aggregation/evaluation means 120, upon judging that the operational policy is valid, effectively updates the "status" (FIG. 5) in the operational-policy storage means 115, and writes the "ignition record" and "service level improvement record" aggregated during the verification into the "ignition record" and "service level improvement record", respectively, of the operational-policy storage means 115. The record aggregation/evaluation means 120, upon judging that the operational policy is invalid, updates the "status" of the operational-policy storage means 115 by "invalid".

The operational policy for which the "status" is judged valid is applied by the operational-policy execution means 113 to the information system assigned to the client corporations hereinafter. The operational-policy execution means 113 continues aggregation of the policy ignition record and service level improvement record in the information system 103, by using the procedure similar to that of the verification. The operational policy for which the "status" is judged invalid is discarded hereinafter. The discard of the operational policy may be performed immediately after the end of verification, or may be performed in a group at a regular interval by searching operational policies for which the "status" is invalid.

Hereinafter, verification of the operational policy is described in detail. FIG. 10 shows a flowchart of the procedure of verification of an operational policy in which the application and service level are specified. An operator of the outsourcing provider data center inputs the newly-created operational policy using the console 118 (step S1001). For example, the operator inputs the new operational policy created for "application=CTI" and "service level=level 2" from the console 118. The operational policy input at step S1001 includes the contents shown in FIG. 6, for example. At step S1001, the operator may input a plurality of operational policies for a combination of the application and service level. The operational-policy storage means 115 assigns a policy identifier (101) to the operational policy input at step S1001, initializes the same by "ignition record=0", "service level improvement record=0", and "status=under verification", and enters therein the input new operational policy (step S1002). In addition, operational-policy storage means 115 initializes the "ignition record" and "service level improvement record" in the record aggregation/evaluation means 120 by "0".

After the new operational policy is stored in the operational-policy storage means 115, the information-system classification means 114 selects an information system 130 out of a plurality of information systems 103, which has the application and service level specified by the operational policy, as an analogous operational policy, and determines the analogous operational policy 103 as the information system used for verification (step S1003). At step S1003, information systems S01 and S02, for example, are judged analogous based on "application=CTI" and "service level=level 2", and the analogous information systems are determined as the information systems 103 used for verification. The configuration storage means 111 describes a specific identifier indicating that the information systems 103 are assigned to the purpose of verification, as attribute information of the client identifier of the information systems 103. Thereafter, the operational-policy execution means 113 executes the operational policy in the information systems 103 determined to be used for verification at step S1003, and aggregation is performed based on the ignition record and service level improvement record of the operational policy (step S1004).

At step S1004, the operational-policy execution means 113 refers to the configuration storage means 111 and condition monitoring means 112 at a predetermined time interval, for example, to acquire the state of the information systems 103 used for verification. The operational-policy execution means 113 compares the acquired state and the configuration information description and state information description which were described in the operational policy description, to judge whether or not the condition contents (IF sentence) described in the operational policy are satisfied. It is to be noted that since the verification uses information systems which are analogous to an operational policy to which the operational policy should be applied, there may be a case wherein the model name etc. of the server described in the configuration information description (refer to FIG. 6 and FIG. 7) does not coincide with the model name etc. of the server of the information system 103 used for verification. The operational-policy execution means 113 does not perform a strict comparison at this portion.

The operational-policy execution means 113, upon judging that the condition contents are satisfied, ignites the operational policy and performs the setting change described in the configuration change description (THEN sentence) via the SNMP manager 119. At this stage, the operational-policy execution means 113 increments the "ignition record" in the record aggregation/evaluation means 120. Ignition of the policy may occur in any of a plurality of information systems 103, if the plurality of information systems 103 are determined to be used as the information systems for verification at step S1003.

The operational-policy execution means 113 acquires from the service-level storage means 117 the target value corresponding to the application and service level of the operational policy. The operational-policy execution means 113 judges whether or not the policy ignition provided an approaching target value after the execution of setting change based on the state information which the condition monitoring means 112 is supervising. If the operational-policy execution means 113 judges that an approaching target value has occurred, the operational-policy execution means 113 increments the "service level improvement record" in the record aggregation/evaluation means 120. If the operational-policy execution means 113 judges that a retreating target value has occurred, the operational-policy execution means 113a does not change the "service level improvement record".

The record aggregation/evaluation means 120 judges whether or not the "ignition record" exceeded the predetermined value (step S1005). This predetermined value is input by the operator of the outsourcing service provider data center by using the console 118. As the predetermined value, "80 times of policy ignition record" is adopted, for example. If the predetermined value is not exceeded, the process returns to step S1004 to continue the aggregation of the ignition record and service level improvement record. The record aggregation/evaluation means 120, if it judges at step S1005 that the "ignition record" exceeded the predetermined value, judges whether or not the relationship between the ignition record and the service level improvement record satisfies the predetermined condition (step S1006). This judgment is performed for each policy if there are a plurality of operational polices. The predetermined condition is input by the operator of the outsourcing provider data center by using the console 118. For example, "(service level improvement record)÷(ignition record)>95%" may be adopted as the predetermined condition.

The record aggregation/evaluation means 120, if it judges at step S1006 that the predetermined condition is satisfied, judges that the operational policy under verification is valid, and updates the "status" in the operational-policy storage means 115 by "valid" (step S1007). In addition, the record aggregation/evaluation means 120 stores the "ignition record" and "service level improvement record" aggregated during the verification in the operational-policy storage means 115. If it is judged at step S1007 that the predetermined condition is not satisfied, it is judged that the operational policy under verification is an invalid operational policy, and the status in the operational-policy storage means 115 is updated by "invalid" (step S1008).

FIG. 11 shows a flowchart of the procedure of verification of the operational policy in which the service level is not specified. The operator of the outsourcing provider data center inputs the newly-created operational policy by using the console 118 (step S1101). The operator inputs the new operational policy which describes "application=CTI" and "service level= not specified" (without description), for example, from the console 118. The operational-policy storage means 115 assigns a policy identifier to the operational policy input at step S1101, initializes the same by "ignition record=0", "service level improvement record=0", status=under verification" and stores the operational policy therein (step S1102). Moreover, operational-policy storage means 115 initialize the "ignition record" and "service level improvement record" in the record aggregation/evaluation means 120.

The operational-policy storage means 115, upon storing the operational policy which does not specify the service level at step S1102, refers to the service-level storage means 117, sets the lowest service level among the service levels of the application, to which the operational policy is applied, as an operational policy (step S1103). For example, if the service-level storage means 117 includes the information shown in FIG. 8, the CTI application includes service level 2 as a lowest service level. In this case, if the policy identification description shown in FIG. 12 is input, the operational-policy storage means 115 attaches the service level=2, which is the lowest service level, to the policy identification description, upon storing the operational policy.

Thereafter, the operational-policy storage means 115 determines an information system to be used for verification similarly to the procedure of step S1003 (step S1104), executes verification of the operational policy by using a procedure similar to that of step S1004, and aggregates the ignition record and service level improvement record (step S1105). In addition, the operational-policy storage means 115 judges whether or not the ignition record exceeded the predetermined value similarly to step S1005 (step S1106), and judges similarly to step S1006 whether or not the ignition record and service level improvement record satisfy the predetermined condition (step S1107).

If it is judged at step S1107 that the service level and service level improvement record satisfy the predetermined condition, it means that the operational policy is judged to be valid at the current service level. In this case, the operational-policy storage means 115 refers to the service-level storage means 117, investigates whether or not there is a service level one step higher than the service level set at step S1103 for the operational policy (step S1108), and if such a service level exists, sets the service level one step higher than the current service level for the operational policy (step S1109). For example, if service level 2 is set for the CTI application at step S1103, service level 1 which is one step higher than the same is set at step S1108, and overwrites the service level of the policy identification description (FIG. 12) by "1."

After the service level one step higher is set by the operational-policy storage means 115, the process returns to step S1104, wherein the information system 103 to be used for verifying the operational policy at the service level one step higher is determined, executing the steps S1104-S1107 to verify the operational policy at the service level one step higher than the previous level. If it is judged at step S1107 that the predetermined condition is not satisfied at the current service level, the operational policy is invalid at the current service level. In this case, it is judged that the operational policy is valid at the service level one step lower than the current service level (step S1110), and resets the service level of the operational policy at the service level one step lower. Thereafter, the "status" in the operational-policy storage means 115 is updated by "valid" in a procedure similarly to that of step S1008. It is to be noted that, since the service level one step lower does not exist if the operational policy is judged invalid at the lowest service level, the operational policy is judged invalid, whereby the "status" in the operational-policy storage means 115 is set "invalid" in a procedure similar to that of step S1009.

If it is judged that the service level one step higher does not exist at step S1108 subsequent to the judgment that the predetermined condition is satisfied by step S1107, it means that the operational policy is judged to satisfy the predetermined condition at the current highest service level. In this case, the operational policy is judged valid by the verification at the highest service level (step S1111), and the "status" in the operational-policy storage means 115 is effectively updated in a procedure similar to that of step S1008.

If the operational policy input from the console 118 is judged valid in the verification by using the above procedure of verification, the same operational policy judged valid is used for creation of a new operational policy in an improvement procedure, and the thus improved operational policy is subjected to a verification FIG. 13 shows a flowchart of the procedure of verification of the operational policy generated by the improvement. If verification of the operational policy input from the console 118 is completed and the "status" in the operational policy is updated by "valid", the operational-policy modification means 116 acquires the operational policy which is judged valid (step S1301). In addition, another operational policy, which includes an application and a service level same as the application and service level of the operational policy acquired at step S1301, and for which the "status" is valid, is acquired from the operational-policy storage means 115 (step S1302). Thereafter, the operational policy acquired at step S1301, and the operational policy acquired at step S1302 are used to create a new operational policy in an improvement procedure (step S1303).

The improvement of the operational policies performed at step S1303 uses an interchange-type improvement and a combination-type improvement. The interchange-type improvement uses a view of the genetic programming, and aims at creation of an operational policy by which an improvement record can be acquired at a higher service level. By using the interchange-type improvement, an operational policy by which an improvement record can be acquired at a higher service level is first created, and then improved to be versatile by a combination-type improvement, thereby achieving a high-quality operational policy with less malfunctions.

FIG. 14 shows the state of creation of the operational policy by using the interchange-type improvement. First, an arbitrary operational policy having an application and a service level same as the application and service level of the operational policy judged valid in the verification is selected out of the operational-policy storage means 115. For example, an operational policy having a maximum value of (service level improvement record)÷(ignition record) is selected out of the operational-policy storage means 115. Subsequently, description of the operational policy judged to be valid in the verification and description of the operational policy selected out of the operational-policy storage means 115 are partially overwritten to create a new operational policy. In the example of FIG. 14, state information description 01 of the operational policy P01 and state information description 02 of the operational policy P02 are interchanged, to thereby create two new operational polices from the operational polices P01 and P02.

The basic patterns of the interchange-type improvement include the following three types: interchange of the configuration information description; interchange of state information description; and interchange of configuration change description. The three types of creation of the operational policy may be performed simultaneously, to thereby increase the newly-created operational policies from two pieces to six pieces in the improvement. Alternatively, one of the three types may be selected for creation at random. Furthermore, three types of simultaneous interchange of the configuration information description and state information description, simultaneous interchange of the configuration information description and configuration change description, simultaneous interchange of the state information description and configuration change description may be realized by repeating the procedure of creation of the above basic patterns.

If it is intended to create a new operational policy by the interchange-type improvement using the operational polices P01 and P02, the configuration information description cannot be interchanged between the operational policy P01 and the operational policy P02, because both the configuration information descriptions are the same. Moreover, if the configuration change description is interchanged between the operational polices P01 and P02 to create two operational policies, the two are equivalent to the operational policies shown in FIG. 14, wherein the state information description is interchanged therebetween. In such a case, the two operational polices shown in FIG. 14 are the target for verification.

FIG. 15 shows the state of creation of the operational policy by a combination-type improvement. The combination-type improvement is intended to create a versatile operational policy applicable to the configurations of the information system 103 as many as possible under the conditions of the given application and service level. First, an arbitrary operational policy having an application and a service level same as the application and service level of the operational policy judged to be valid in the verification is selected out of the operational-policy storage means 115. For example, an operational policy having a maximum value of (service level improvement record)÷(ignition record) is selected out of the operational-policy storage means 115. Subsequently, a common description between the operational policy judged to be valid in the verification and the operational policy selected out of the operational-policy storage means 115 is used for combination, to create a single operational policy. Upon creating the single operational policy from the operational policy P01 and operational policy P02 by a combination-type improvement, since the policy identification description and configuration information description 01 each are a common description between the operational policy P01 and the operational policy P01, these descriptions are used for combination to create a single operational policy having two branches extending separately at the state information description and succeeding description.

With reference to FIGS. 6 and 7, state information description 01 is "number of concurrent accesses>20 per server", configuration change description 01 is "change setting on priority of telephone response to "high", state information description 02 is "number of concurrent accesses>30 per server", and configuration change description 02 is "change setting of spare server to working". In this case, the operational-policy execution means 113, upon executing the operational policy after the improvement, interprets the portion of the branch-off of the operational policy after the improvement as "IF 30>(number of concurrent accesses>20 per server), THEN (change setting on priority of telephone response to "high"), ELSE IF (number of concurrent accesses>30 per server), THEN (change setting of spare serve to working)."

It is to be noted that there may be a case where the operational policy created by the combinations improvement includes a branch-off portion in which the conditions of the separated two state information descriptions are not exclusive and may be concurrent in the improved operational policy. In such a case, two types of the operational policy are prepared in which one of the two is corrected to allow the branch-off portion satisfy the exclusive conditions. For example, as shown in FIG. 16 (a), if state information description 01 of the operational policy P1 is "number of concurrent accesses<30 per server" and the configuration change description 01 thereof is change setting on priority of telephone response to "high", and as shown in the FIG. (b), if state information description 02 of the operational policy P02 is "number of concurrent accesses>25 per server", and configuration change description 02 thereof is "change setting of spare server 3 to working", two types of the operational policy are created so that the separated portions of the branch-off are exclusive. In this case, the operational-policy execution means 113 interprets one of the operational policies to define "IF (number of concurrent accesses<30 per server), THEN (change setting on priority of telephone response to "high"), ELSE IF (number of concurrent accesses>30 per server), THEN (change setting of spare server 3 to working)" (FIG. 16(c)). In addition, the operational-policy execution means 113 interprets the other of the operational policies to define "IF (number of concurrent accesses<25 per server), THEN (change setting on priority of telephone response to "high"), ELSE IF (number of concurrent accesses>25 per server), THEN (change setting of spare server 3 to working)" (FIG. 16 (*d*)).

Turning to FIG. 13, if an operational policy is generated by an interchange-type or combinations improvement, similarly to step S1002 of FIG. 10, the operational policy created at step S1303 is entered into the operational-policy storage means 115 (step S1304). Thereafter, the information-system classification means 114 determines, similarly to step S1003, the information system to be used for verification of the operational policy created at step S1303 (step S1305), and the operational-policy execution means 113 performs, similarly to step S1004, aggregation of the number of times of policy ignition and the service level improvement record (step S1306).

The record aggregation/evaluation means 120 judges, similarly to step S1006, whether or not the ignition record of the operational policy exceeded the predetermined value (step S1307), and if exceeded, judges whether or not the aggregated ignition record and service level improvement record satisfy the predetermined condition (step S1308). If it is judged at step S1308 that the predetermined condition is satisfied, the record aggregation/evaluation means 120 compares the values of (service level improvement record)÷(ignition record) before and after the improvement, based on the "ignition record" and "service level" of the operational policy stored in the operational-policy storage means 115 and the "ignition record" and "service level improvement record" in the record aggregation/evaluation means 120 (step S1309). It is thus judged whether or not the value after the improvement is larger than the value before the improvement (step S1310).

In the result of comparison, if the value of (service level improvement record)÷(ignition record) after the improvement is larger than the value of (service level improvement record)÷(ignition record) before the improvement, the operational policy after the improvement is more valid for maintaining the service level compared to the operational policy before the improvement. In this case, the "status" of the operational policy before the improvement is invalidated, whereas the "status" of the operational policy after the improvement is validated (step S1311). Contrary to this case, if the value of (service level improvement record)÷(ignition record) after the improvement is judged smaller than the value of (service level improvement record)÷(ignition record) before the improvement at step S1310, the operational policy before the improvement is judged more valid for maintaining the service level compared to the operational policy after the improvement, and the "status" of the operational policy after the improvement is invalidated (step S1312).

In the present embodiment, the information-system classification means 114 performs verification of the operational policy by using the information system 103 judged as an analogous information system. This allows a larger number of information systems 103 to be used for verification of the operational policy, or for improvement to a versatile use thereof, whereby the test time length can be reduced before the actual operation of the operational policy. Thus, the time length needed from the test to the actual operation of the information system 103 which guarantees the service level is reduced, whereby the outsourcing service provider can provide the information system 103 of the service level for which the service contract is concluded, in a short time of period after conclusion of the contract with the client company.

In the present embodiment, as to the operational policy in which the service level is not specified, a consecutive verification can be performed from a lower service level to a higher service level to judge the service level at the operational policy can be applied. This allows a suitable service level to be found automatically, whereby the working burden on creation of the service-level policy is reduced. Moreover, in the present embodiment, the improvement procedure of the operational policy allows the operational policy already verified to be improved to thereby provide an improved operational policy. If the improved operational policy is judged more valid for maintaining the service level compared to the operational policy before the improvement, the operational policy after the improvement is used as an operation policy for the information system actually assigned to the client company. Thus, the present embodiment realizes a higher service-level improvement, and can generate a versatile operational policy suited to a larger number of information systems 103.

FIG. 17 shows the configuration of an information-system providing system according to a second embodiment of the present invention. The information-system providing system of the present embodiment is different from the first embodiment in that a resource pool 105, a resource-pool control means 106, and a switch 107 are added to the configuration shown in FIG. 3. In the present embodiment, in addition to or instead of the existing information system 103, another information system 103 created for the purpose of verification is used to verify the operational policy.

The resource pool 105 includes computer resources, network resources, application resources, and a data resources. Each of these resources is arranged as alone in the resource pool 105. In this state, this system cannot be operated as an information system 103 which satisfies the given application and service level. In the resource pool 105, a large number of servers, load balancer units, firewall units, hard disk drives that store therein application and data etc. are connected to the switch 107.

Each resource in the resource pool 105 is connected to the information system 103 by changeover of the switch 107. Connection of the information system 103 and the resources in the resource pool 105 by using the switch 107 allows the resources to be used as part of the information system 103. Moreover, if some resources are connected together in the resource pool 105, they may be considered as a new information system 103. The resource-pool control means 106 operates the resources in the resource pool 105. The resource-pool control means 106 controls the switch 107 to control the connection state of each resource. This allows the configuration of the information system 103 to be changed or can create a new information system 103.

An example of operation of the resource-pool control means 106 is such that the resource-pool control means 106 creates a new information system 103 by using the resources in the resource pool 105 in response to a new contract with the client company. The client company, upon receiving the offer of service, specifies the application and service level of the information system, for which the outsourcing service contract is concluded, via the gateway unit 104 and service-contract IF means 102. In this case, the information system 103 is configured by the resource-pool control means 106 via the service-contract IF means 102 and configuration storage means 111.

The resource-pool control means 106 determines the type and number of needed resources based on the application and service level specified from the client company. For example, the number of servers is two for level 2 of the service level in the CTI application, and four for level 1. The information for determining the number of resources is stored in the resource-pool control means 106 in association with the application and service level thereof.

The resource-pool control means 106 operates the switch 107 to connect together the resources in the resource pool 105. For example, the resource-pool control means 106 connects one piece of the load balancer unit to one piece of the firewall unit, connects four sets of the servers to one piece of the load balancer unit, and connects a hard disk drive to each server. Thereafter, the resource-pool control means 106 starts the application on the server, to make the same in service. By performing such operation, a new information system 103 is created from the resource pool 105.

The information system 103 thus created by the resource-pool control means 106 is assigned to the client company via the information-system provider server 100 from the service-contract IF means 102. The information-system provider server 100 provides an account by which the client company is allowed to access to the information system 103 from the Internet or VPN.

The resource-pool control means 106, upon canceling of the service contract with the client company by the service-contract IF means 102, disassembles the information system 103 provided to the client, and returns the resources which have configured the information system 103 to the resource pool 105. In the disassembly of the information system, the resource-pool control means 106 stops the application which was run on the information system 103, and operates the switch 107 to release the connection between the resources. Thus, the resources are returned to the resource pool 105, wherein the servers, load balancer units, firewall units, hard disk drives storing therein application and data, etc. are returned into the state of connection to the switch.

FIG. 18 shows the procedure of verification of a newly-created operational policy in the present embodiment. The operator of the outsourcing provider data center inputs, similarly to step S1001 of FIG. 10, the operational policy in which the application and service level are specified, by using the console 118 (step S1801). The operational-policy storage means 115 enters, similarly to step S1002, the operational policy input at step S1801 (step S1802).

The policy classification means 114 determines, using a procedure similar to step S1003, the information system 103 used for verification of the operational policy (step S1803). If it is judged by the policy classification means 114 that there is no information system similar to the information system to which the operational policy is applied, or that the number of such information systems is smaller than the specified number determined beforehand although there are some such information systems, the resource-pool control means 106 performs operation to the resources in the resource pool 105, to create information systems 103 which offer the application and service level corresponding to the operational policy input at step S1801 (step S1804).

For example, if the policy identification description (FIG. 6) of the operational policy is "application=CTI and service level=level 2", the resource-pool control means 106 connects together a plurality of servers in the resource pool 105 at step S1804, drives the CTI application on the servers, and creates an information system 103 corresponding to service level 2 for the CTI application. Thereafter, both the information system 103 determined for use in verification at step S1803 by the operational-policy execution means 113 and the information system created at step S1804 are used for execution of the operational policy input at step S1801, and aggregation of the ignition record and service level improvement record is performed (step S1805).

The record aggregation/evaluation means 120 judges, similarly to step S1005 of FIG. 10, whether or not the ignition record exceeded the predetermined value (step S1806). If the ignition record exceeded the predetermined value, it is judged, similarly to step S1006, whether or not the aggregated ignition record and service level improvement record satisfy the predetermined condition (step S1807). If it is judged at step S1807 that the predetermined condition is satisfied, the operational policy is judged valid and the "status" of the operational policy is updated by "valid" (step S1808). If it is judged at step S1807 that the predetermined condition is not satisfied, the operational policy is judged invalid, and the "status" of the operational policy is updated by "invalid" (step S1809). After the verification of the operational policy is completed, the resource-pool control means 106 promptly disassembles the information system 103 created at step S1804, returns the resources which have configured the information system 103 to the resource pool 105, and allows the resources to be used for other purposes. (step S1810).

In the present embodiment, the validity of the operational policy is verified using the information system 103 created by the resource-pool control means 106. For this reason, the operational policy can be verified even if there is no similar information system 103 in the existing information system 103. Moreover, if a similar information system already exists therein, the operational policy can also be verified using the information system 103 created at step S1804 in addition to the similar information system 103, whereby the operational policy can be verified using a larger number of information systems 103.

Further, verifications of the operational policy as described with reference to FIGS. 10, 11, and 13 may also be performed simultaneously in parallel. Further, verification of another operational policy may also be started during, for example, verification of the operational policy. Although the second embodiment exemplified the case where the operational policy in which the application and service level are specified is verified using the information system 103 created by the resource-pool control means 106, the operational policy for verification is not limited thereto. The operational policy in which the service level is not specified, as described in the first embodiment, may be verified similarly. Although the operational policy in which the service level is not specified is verified while consecutively raising the service level from a lowest service level to a higher service level in FIG. 11, the operational policy in which the service level is specified may also be verified while raising the service level from the specified service level as an initial value by using the procedure shown in FIG. 11. In this case, the operational policy can be verified for application to a higher service level than the specified service level.

Moreover, in the verification of the operational policy, since verification is not completed unless the ignition record of the operational policy exceeds the predetermined value, if the policy ignition condition is improper and thus the policy does not ignite, there may be a case where the verification itself cannot be completed. In such a case, the verification time length is set at one hour, for example, and the operational policy may be judged invalid if the ignition record does not exceed the predetermined value within the one hour since the verification started. Moreover, although a pseudo client unit 108 is used in the verification of the operational policy to issue a request or job for the information system 103 to which the client company is not assigned, this verification may be performed using the information system 103 assigned to the client company. In this case, verification can be performed in a state closer to the actual operational circumstances.

Although an example wherein the operational-policy management server 101 acquires the state etc. of each resource by using the SNMP is shown in the above embodiment, the acquisition is not limited thereto and may use another technique. In addition, although an example is shown wherein the state information and configuration information of each resource is managed by the MIB, the present invention is not limited thereto. For example, if a protocol other than the SMNP is to be used, LDAP (Lightweight Directory Access Protocol) etc. may be used for the management.

Although the present invention is described based on preferred embodiments thereof, the information-system management unit of the present invention, method, and program are not limited to the above exemplified embodiments, and those made by modification and correction of the above embodiments may fall within the scope of the present invention.

BRIEF DESCRIPTION OF THE DRAWINGS

FIG. 4 is a table showing the attribute information of the information system stored in the configuration storage means.

FIG. 5 is a table showing the information stored in the operational policy storage means.

FIG. 8 is a table showing the information stored in the service-level storage means.

FIG. 17 is a block diagram showing the configuration of an information system-providing system according to a second embodiment of the present invention.

Figure 1:
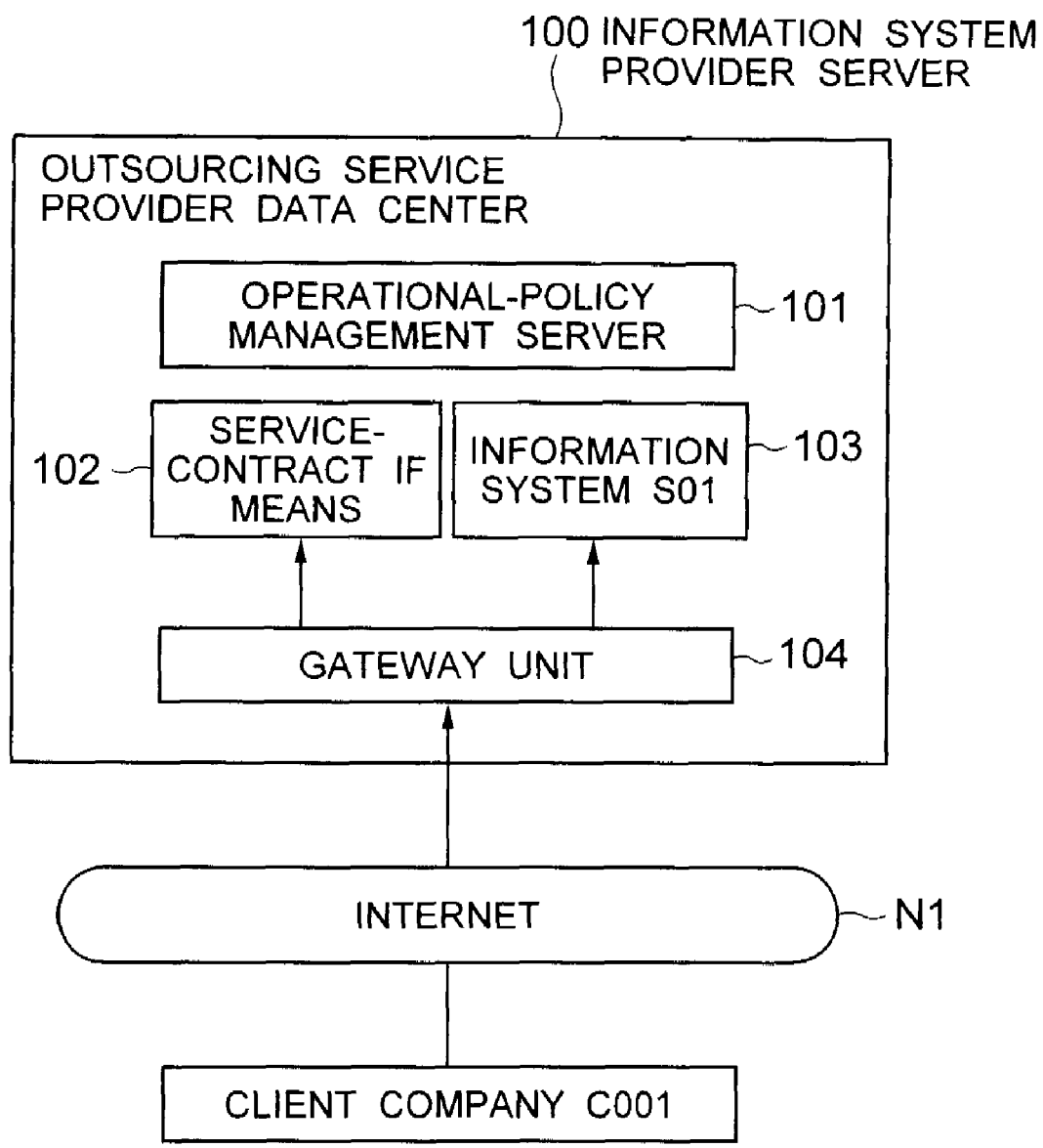
FIG. 1 is a block diagram showing the configuration of an information-system providing system including an information-system provider server according to a first embodiment of the present invention.
Figure 2:
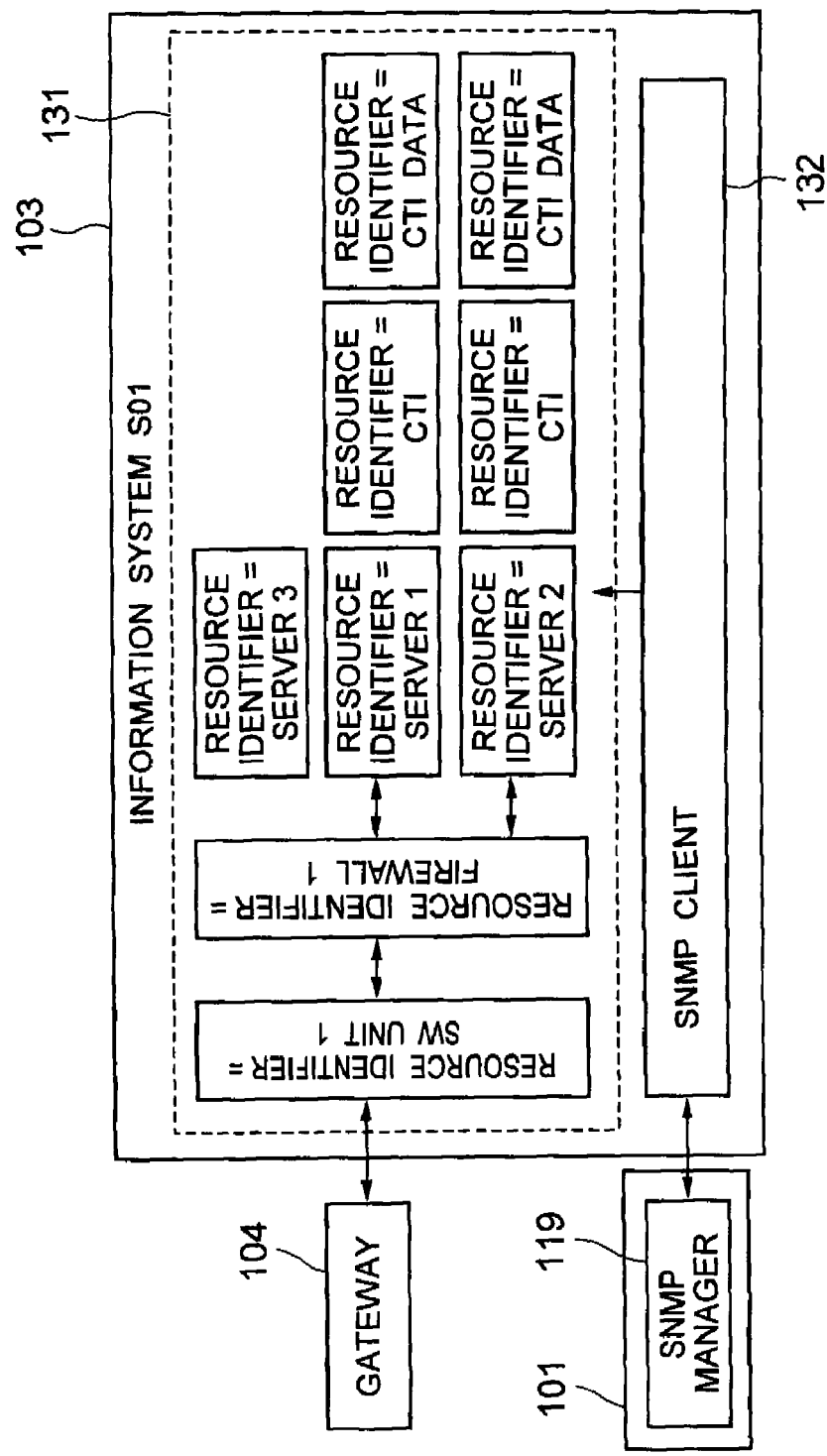
FIG. 2 is a block diagram showing the configuration of the information system.
Figure 3:
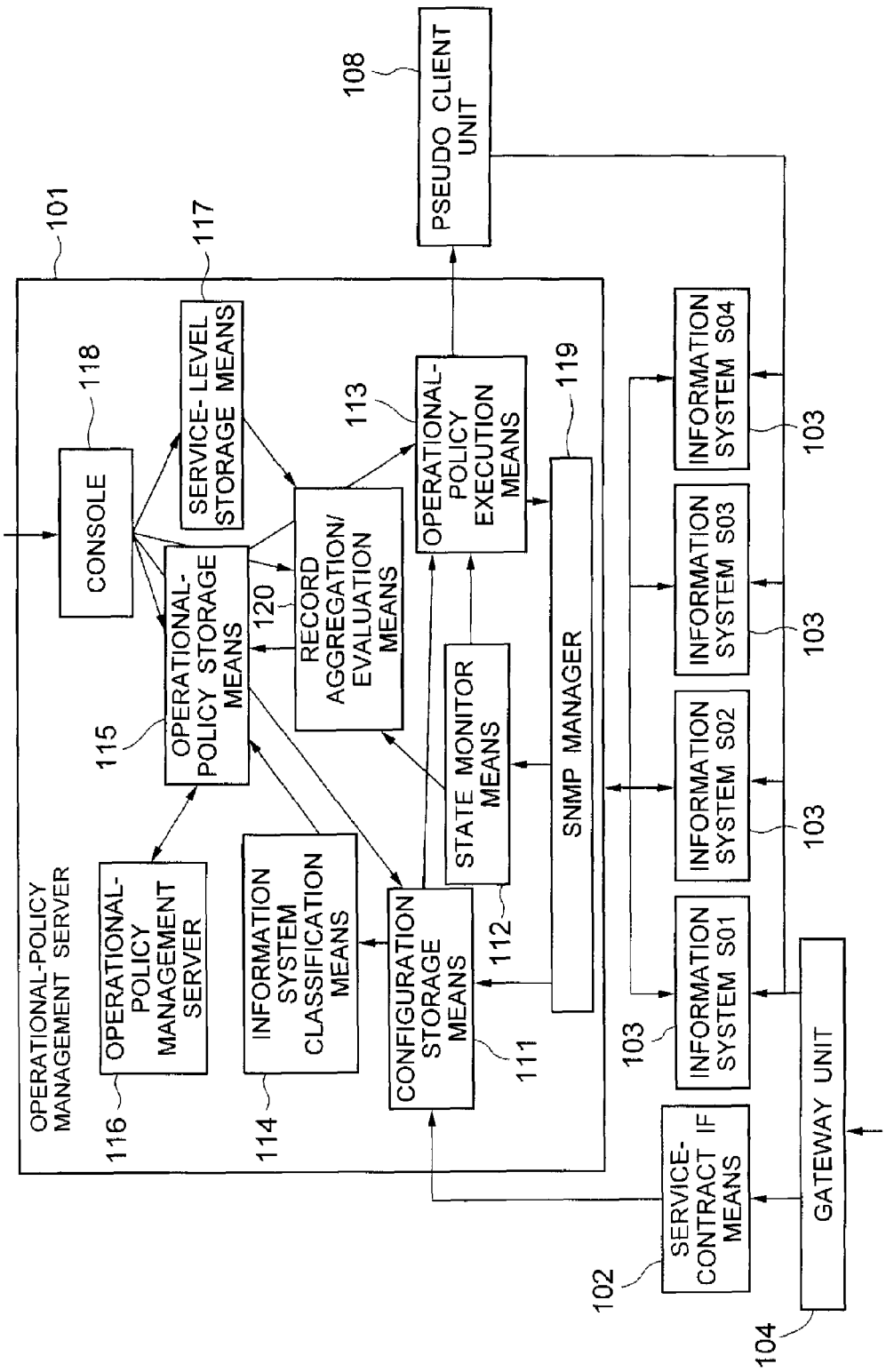
FIG. 3 is a block diagram showing the configuration of the operational-policy management server.
Figure 6:
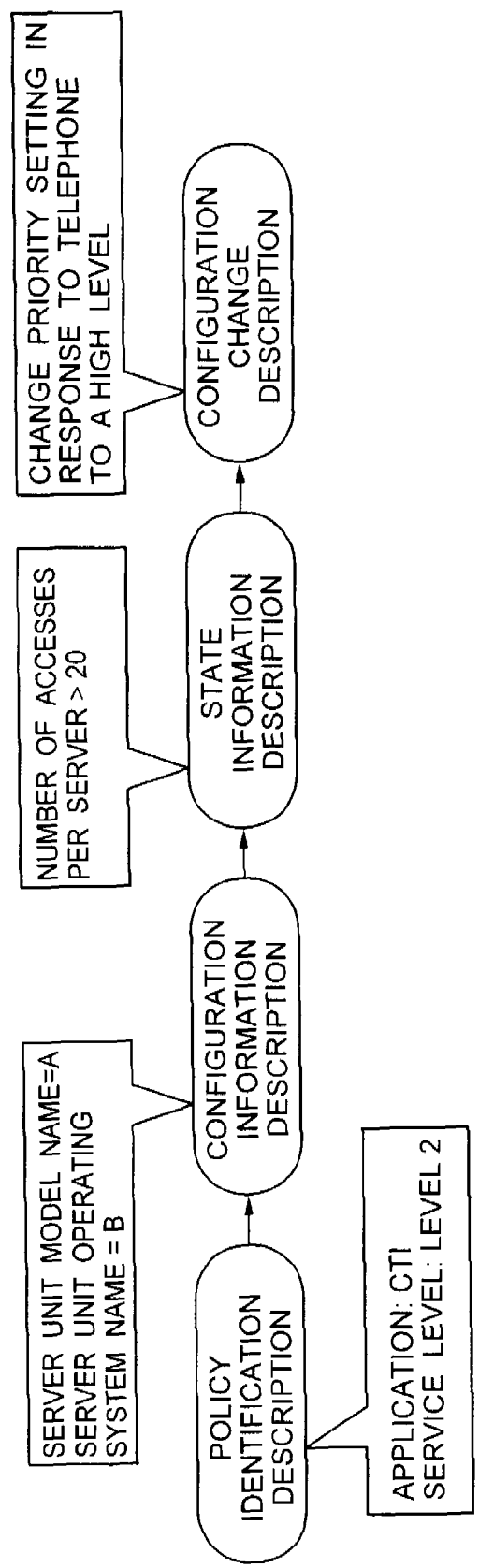
FIG. 6 is a block diagram showing the contents of the operational policy description.
Figure 7:
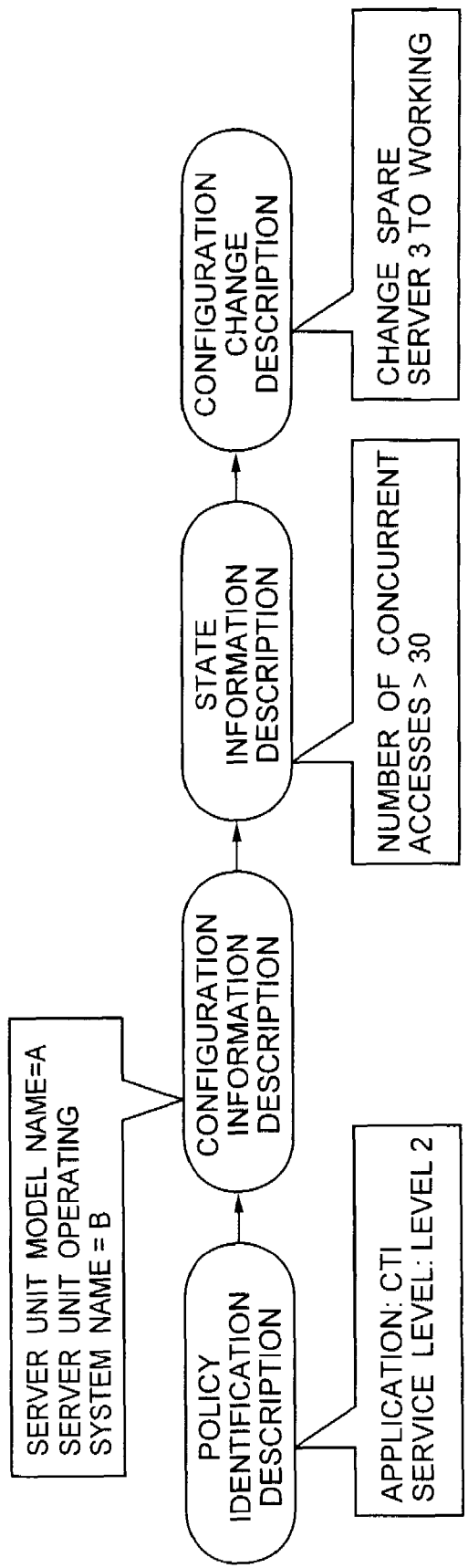
FIG. 7 is a block diagram showing the contents of the operational policy description.
Figure 9:
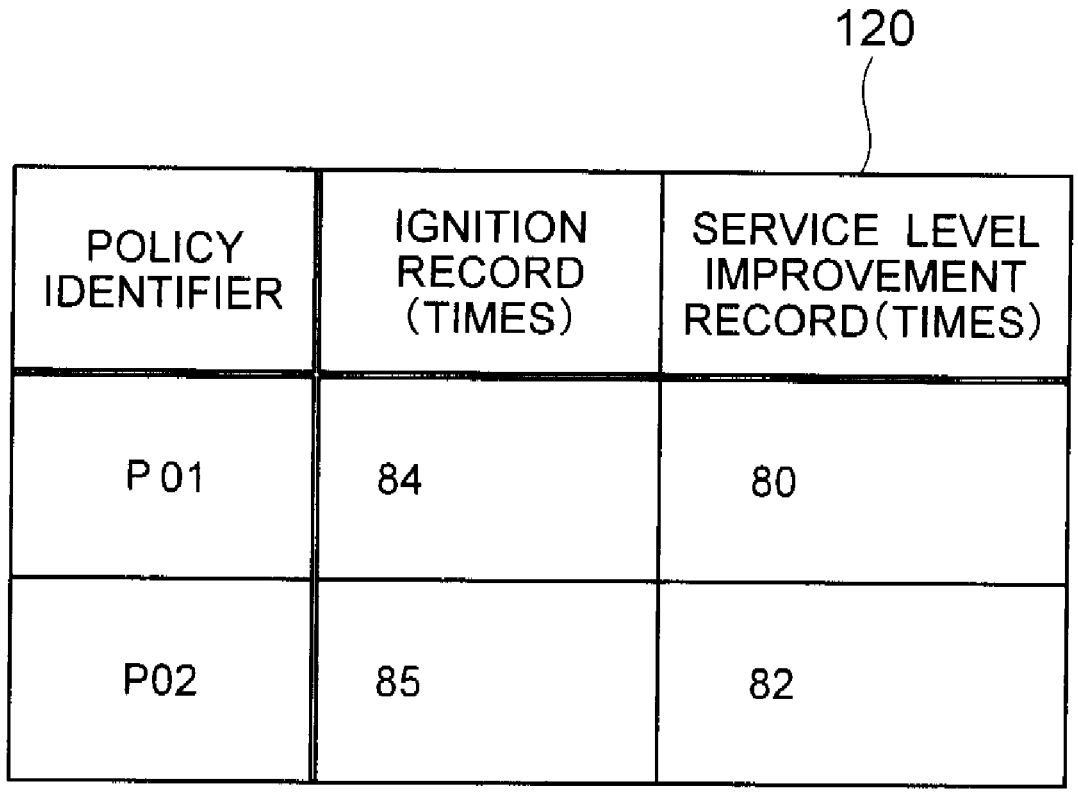
FIG. 9 is a table showing the state of the ignition record and service level improvement record stored in the record aggregation/evaluation means.
Figure 10:
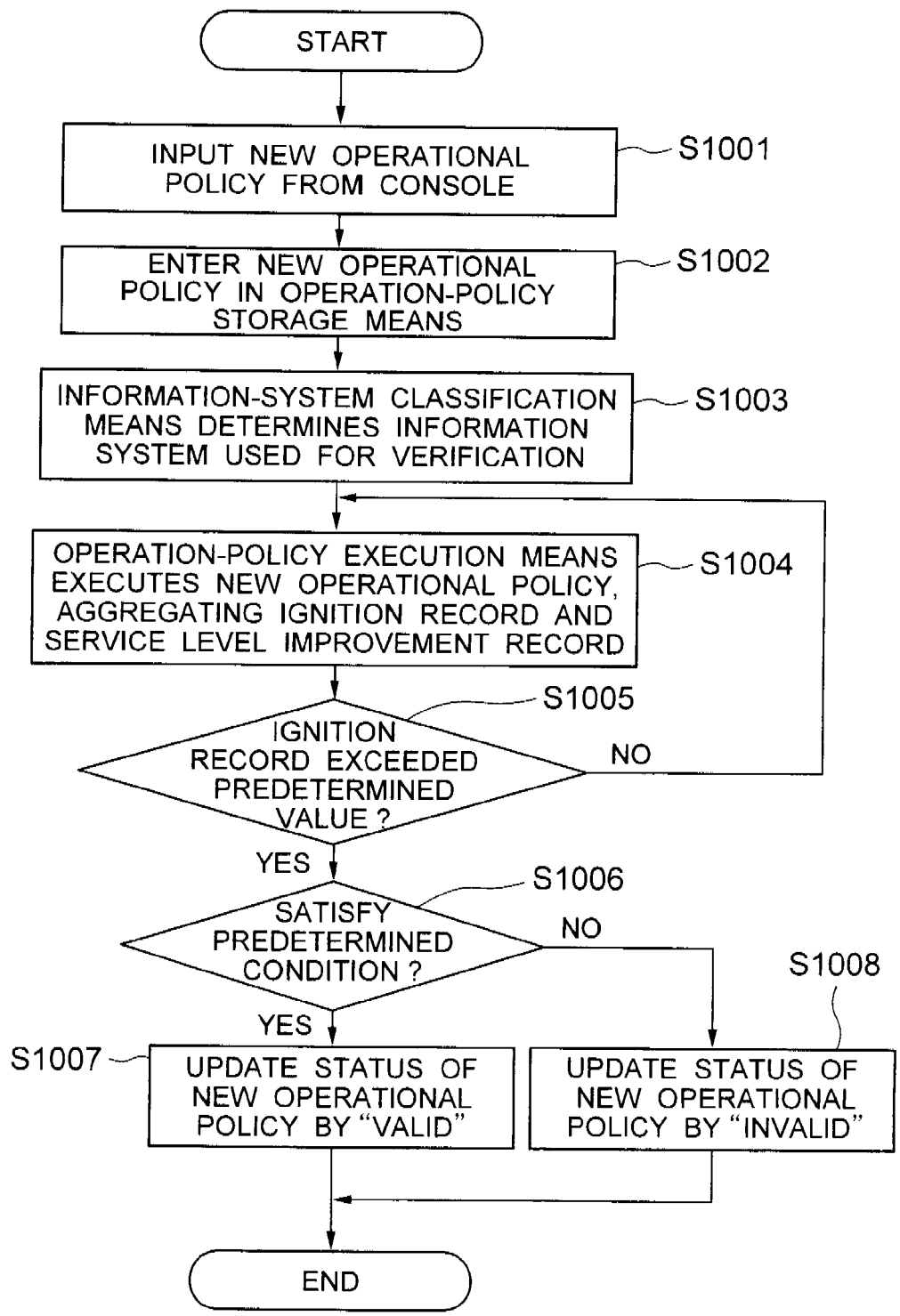
FIG. 10 is a flowchart showing the procedure of verification of a newly-created operational policy.
Figure 11:
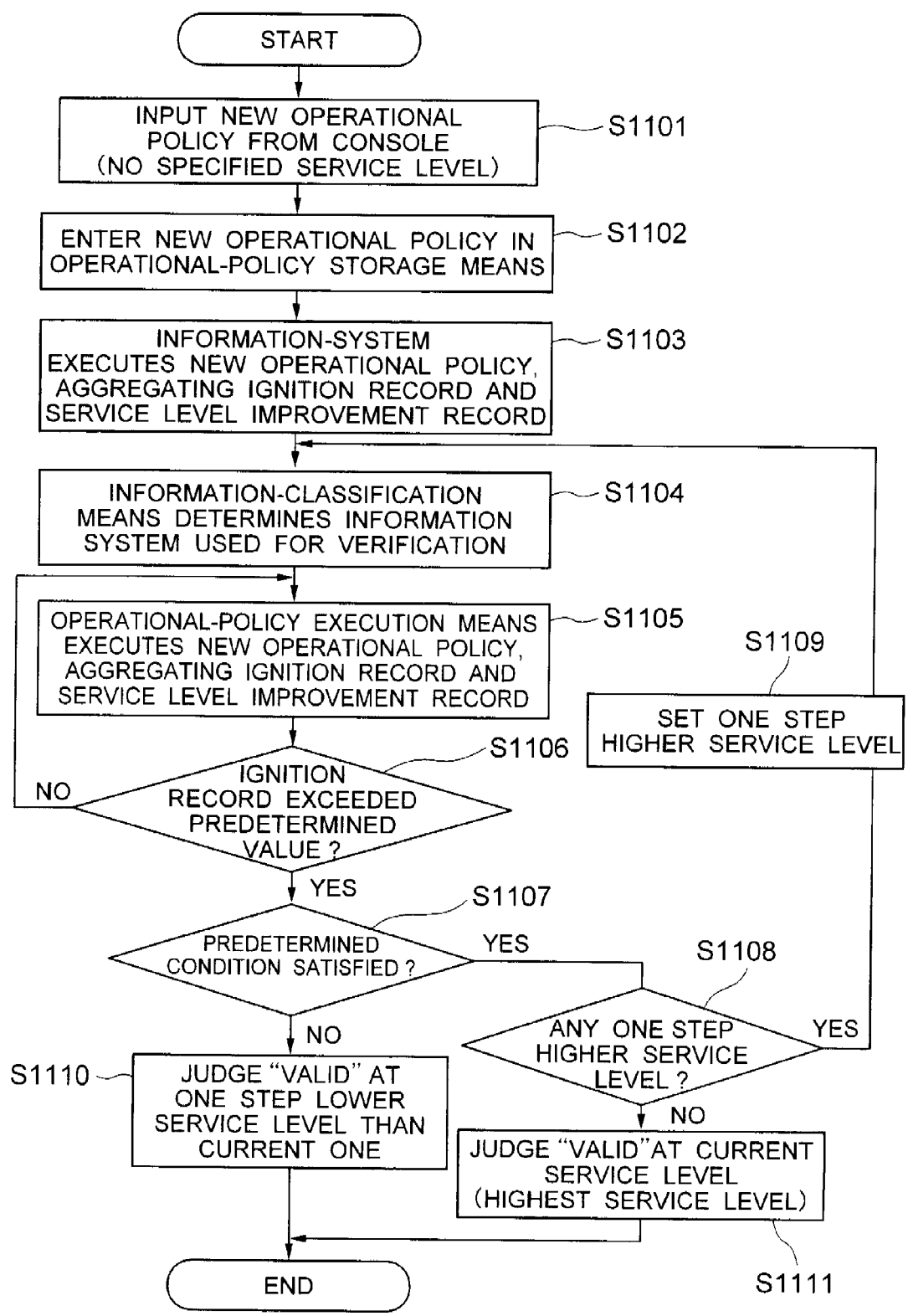
FIG. 11 is a flowchart showing the procedure of verification of an operational policy input without specifying a service level.
Figure 12:
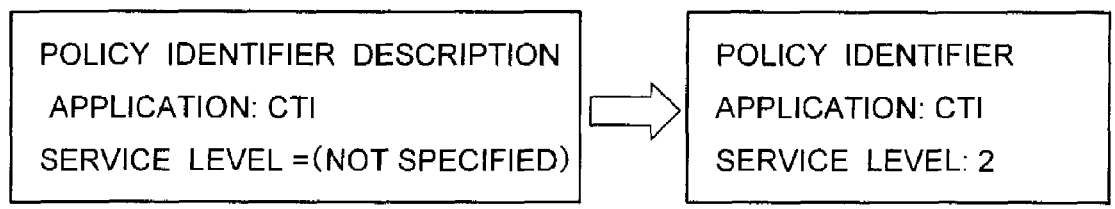
FIG. 12 is a drawing which shows an example of the policy identification description of the operational policy.
Figure 13:
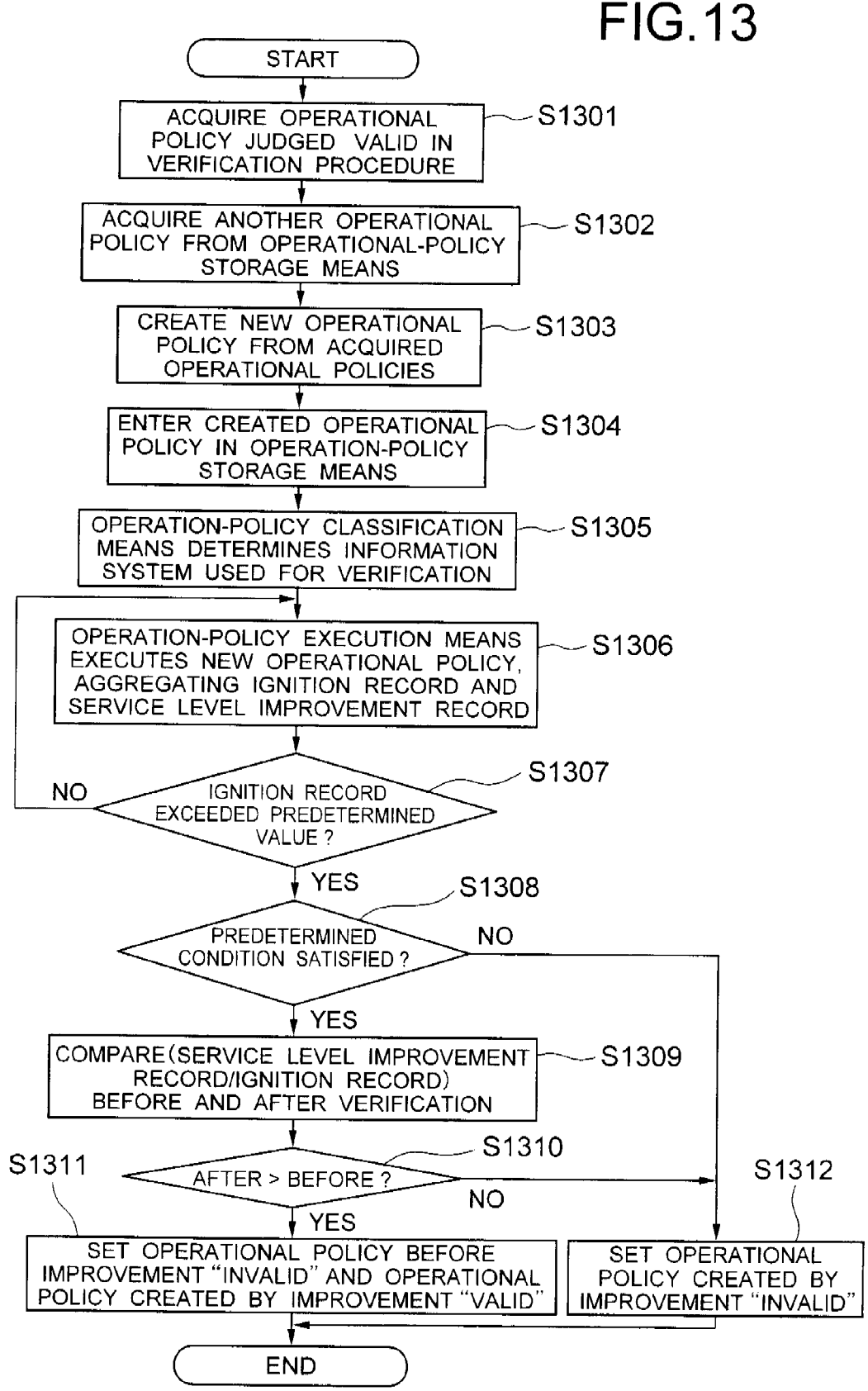
FIG. 13 is a flowchart showing the procedure of verification of an operational policy created by improvement.
Figure 14:
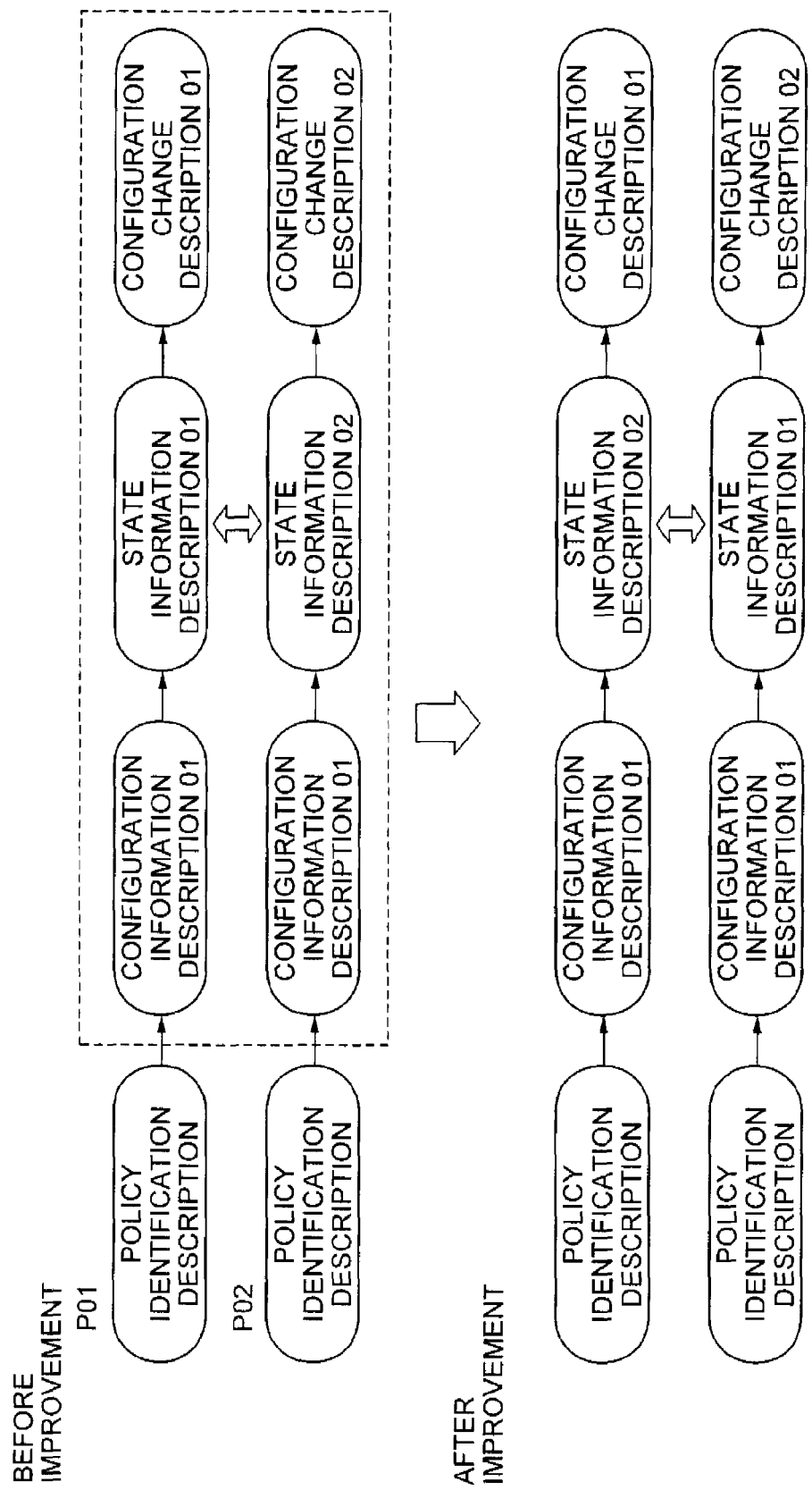
FIG. 14 is a block diagram showing the procedure of creation of an operational policy by an interchange-type improvement.
Figure 15:
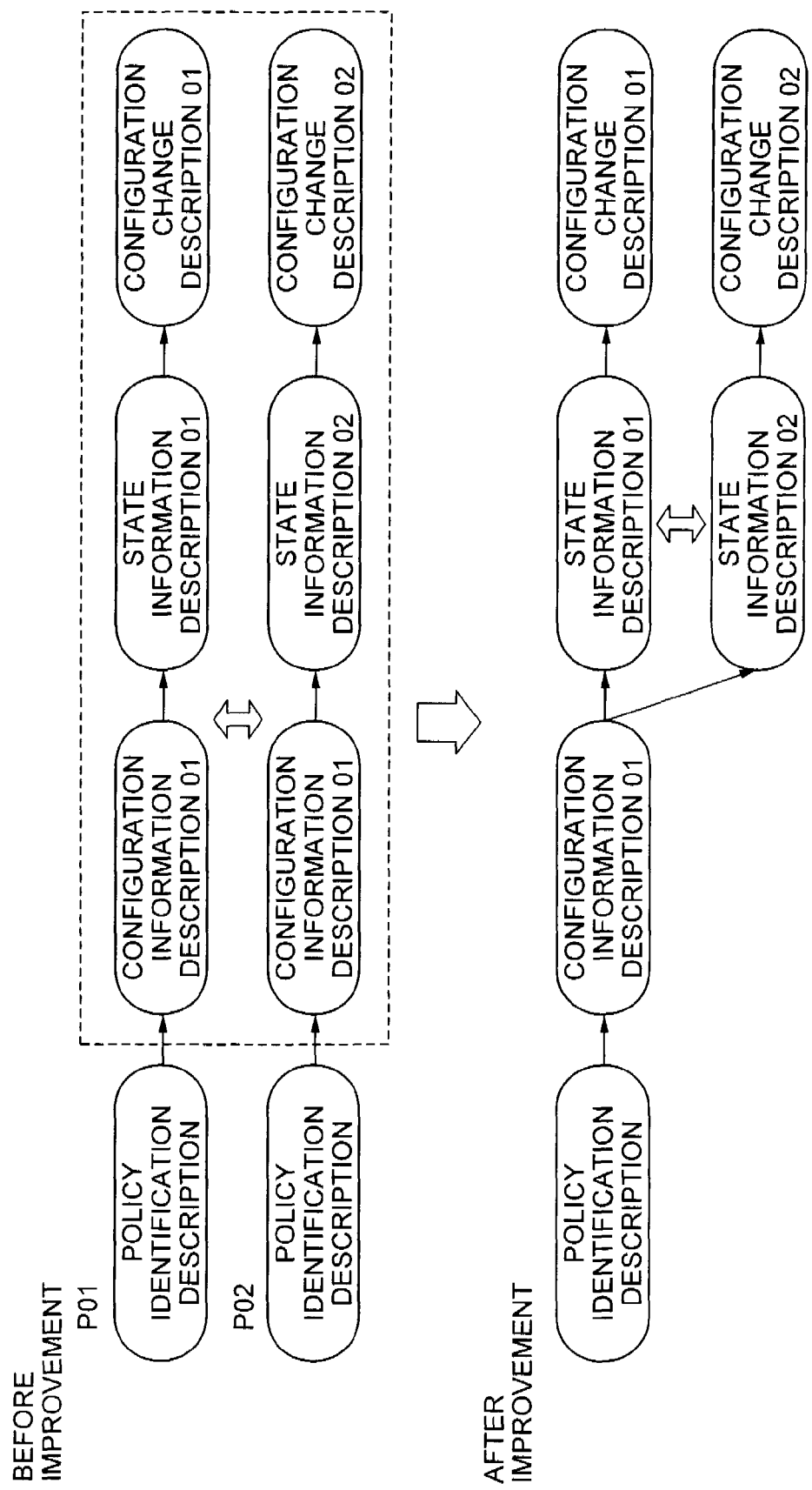
FIG. 15 is another block diagram showing the procedure of creation of an operational policy by a interchange-type improvement.
Figures 16A, 16B, 16C, 16D:
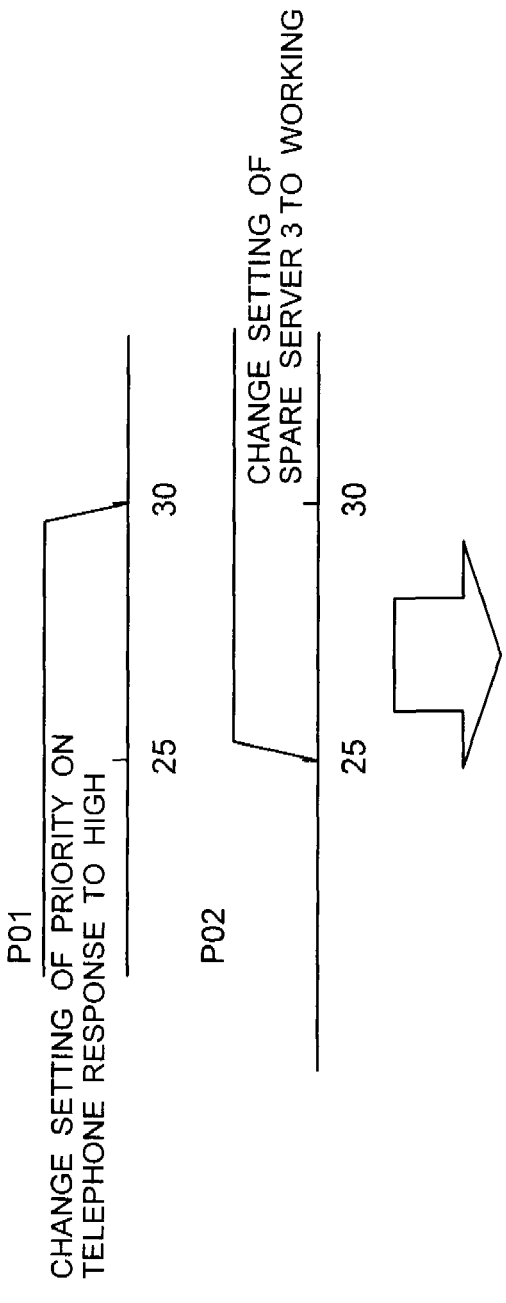
FIGS. 16(*a*) and (*b*) are a schematic diagrams showing the contents of state information description and configuration change description, respectively, of an operational policy, and FIGS. 16 (*c*) and (*d*) are schematic diagrams showing the state of an interpretation of the state information description and configuration change description, respectively, of the operational policy after the improvement.
Figure 18:
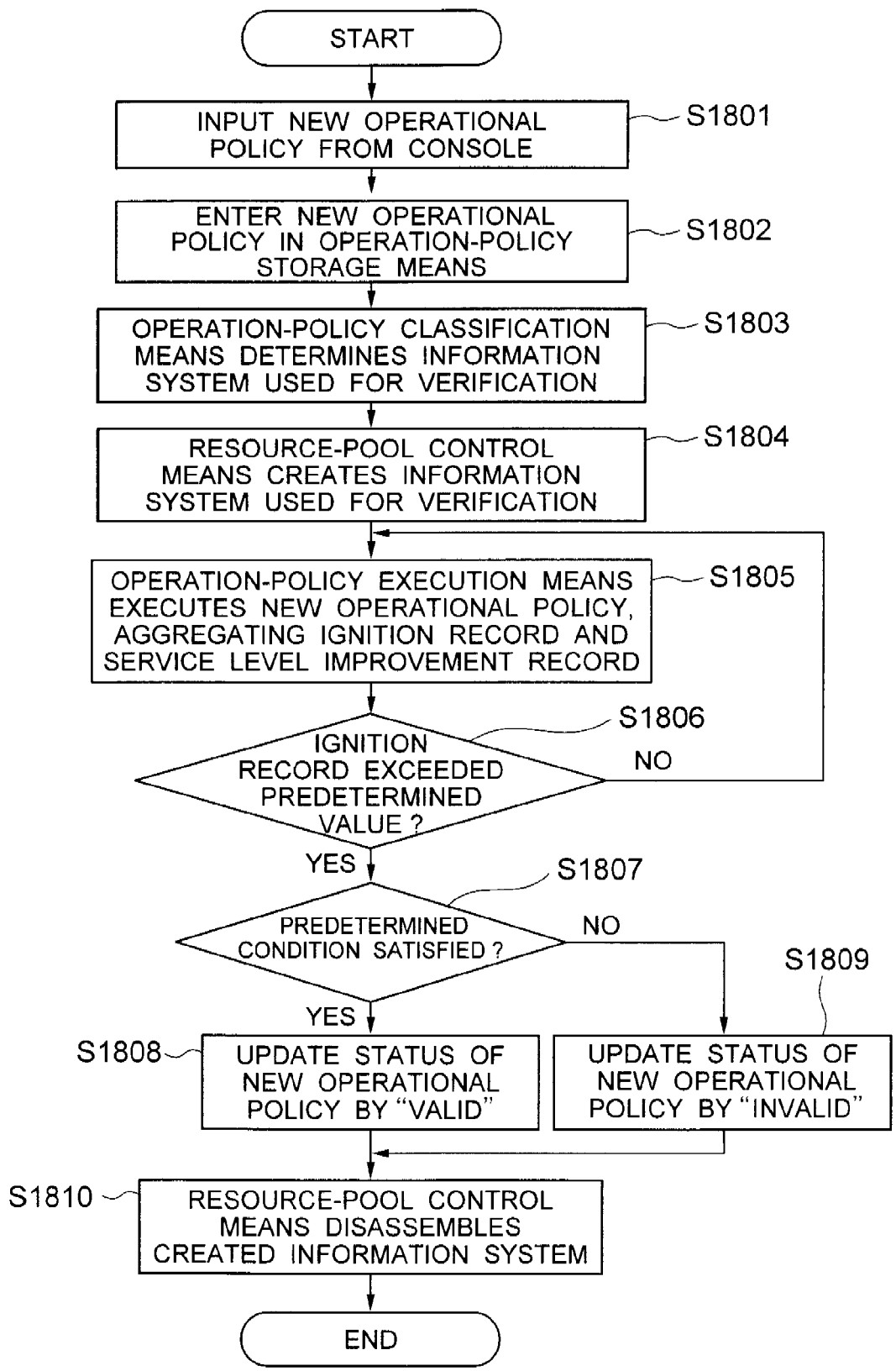
FIG. 18 is a flowchart showing the procedure of verification of a newly-created operational policy in the present embodiment.
Figure 19:
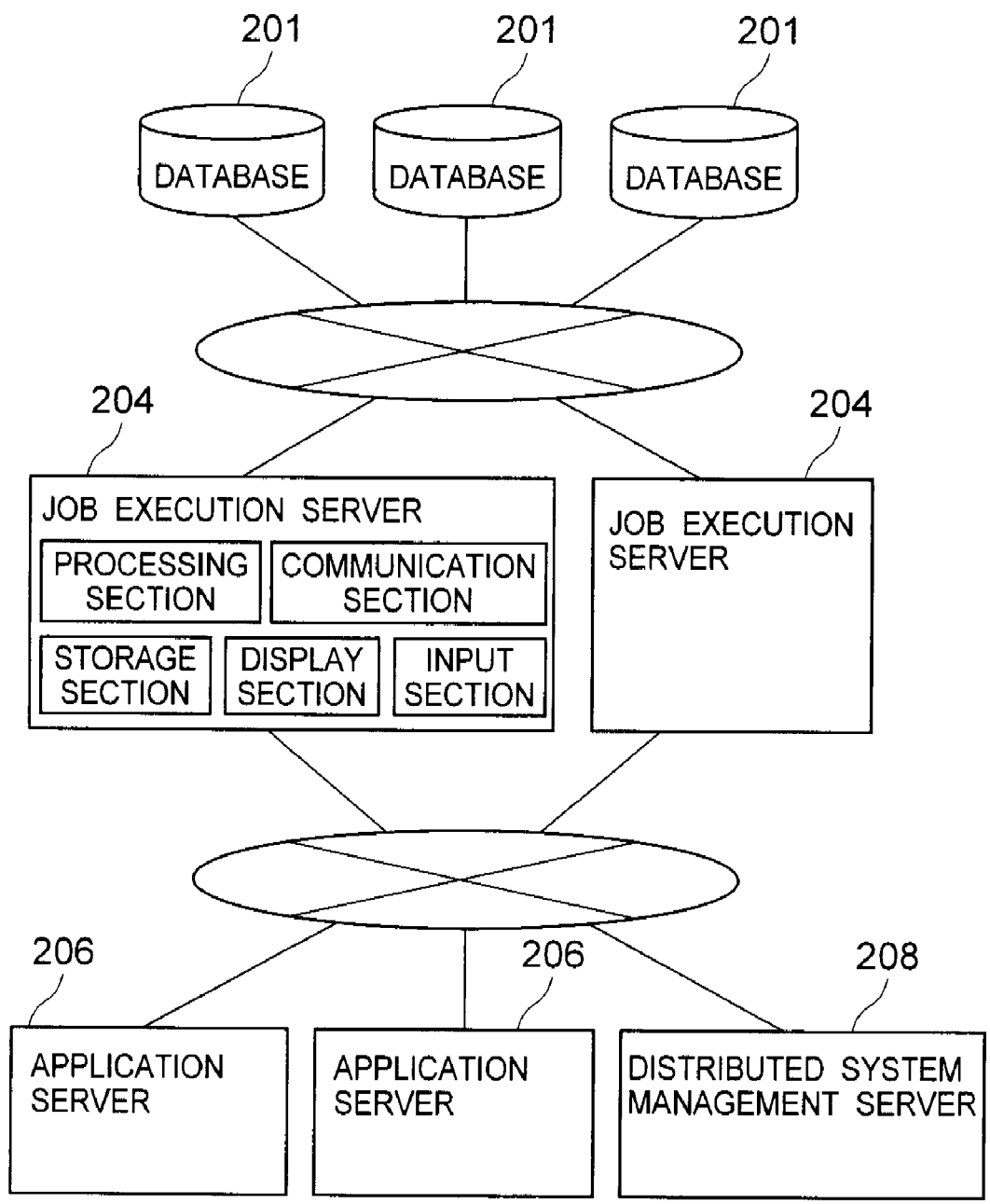
FIG. 19 is a block diagram showing the configuration of the system-management support unit described in Patent Publication-1.
Figure 20:
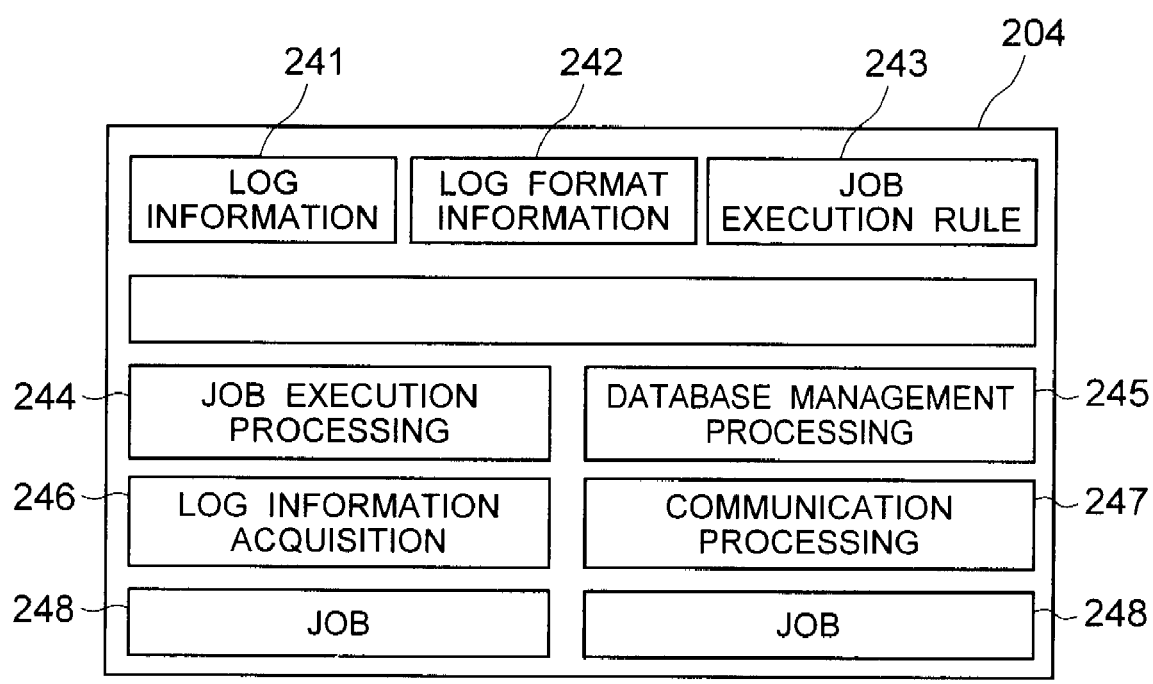
FIG. 20 is a block diagram showing the stored state of the storage section of the job execution server.

The invention claimed is:

1. An information-system management unit for managing a plurality of information systems for which a service to be provided and a service level specifying a guarantee level of the service are specified, comprising:

operational-policy storage means for storing therein an operational policy having a description including a service name, a service level, an operation to be performed to resources in said information systems, and a condition for performing the operation;

configuration storage means for storing therein configuration information including a service name and a service level of each of said information systems;

information system extraction means for extracting at least one of said information systems having a service name and a service level corresponding to said service name and said service level of said stored operational policy, by referring to configuration information stored in said configuration storage means;

operational-policy execution means for applying to said extracted information system a corresponding operational policy, to store record data obtained by said applying; and verification means for verifying a validity of said applied operational policy based on said stored record data, wherein said operational-policy execution means monitors a change of state of said extracted information system between before and after said execution, and stores therein a number of times of condition satisfaction and a number of times of service improvement obtained by said execution as said record data.

2. The information-system management unit according to claim 1, wherein said operational-policy execution means performs said operation described in said corresponding operational policy if said extracted information system satisfies said condition described in said corresponding operational policy.

3. The information-system management unit according to claim 1, wherein said verification means judges said extracted operational policy as a valid operational policy, if a relationship between said number of times of condition satisfaction and said number of times of improvement satisfies a specific condition.

4. The information-system management unit according to claim 1, wherein said operational-policy storage means, upon receiving an operational policy specifying a service to be provided and specifying no service level thereof, stores an operational policy specifying said specified service and a lowest service level among service levels designated for services same as said specified service, and wherein if said verification means (120) judges that said stored operational policy is valid, said operational-policy storage means iteratively replaces said stored operational policy with another operational policy specifying said specified service and a service level higher than said lowest service level or previous service level.

5. The information-system management unit according to claim 1, further comprising policy creation means for reading from said operational-policy storage means a plurality of operational policies specifying a common service and a common service level and judged as valid operational policies by said verification means, to create at least one new operational policy based on said read operational policies.

6. The information-system management unit according to claim 1, further comprising policy creation means for creating a new operational policy based on a specific operational policy verified as a valid operational policy by said verification means, and another operational policy stored in said operational-policy storage means, specifying a service and a service level same as said service and said service level, respectively, specified in said specific operational policy and verified as a valid operational policy by said verification means.

7. The information-system management unit according to claim 6, wherein said verification means compares record data of an operational policy verified as a valid operational policy by said verification means and record data of said new operational policy created by said policy creation means, to judge whether or not said new operational policy is valid based on result of said comparison.

8. The information-system management unit according to claim 5, wherein said policy creation means interchanges at least one of said operation and said condition between a plurality of said operational policies, to create said new operational policy.

9. The information-system management unit according to claim 5, wherein said policy creation means uses a common description in at least one of said operation and said condition specified of a plurality of operational policies, to create said new operational policy.

10. An information-system management method using a server for managing a plurality of information systems for which a service to be provided and a service level specifying a guarantee level of the service are specified, comprising the steps of:
said server storing in operational-policy storage means an operational policy having a description including a service name, a service level, an operation to be performed to resources in said information systems, and a condition for performing the operation;
said server storing in configuration storage means configuration information including a service name and a service level of each of said information systems;
said server extracting at least one of said information systems having a service name and a service level corresponding to said service name and said service level of said operational policy, by referring to configuration information stored in said configuration storage means;
said server applying to said extracted information system a corresponding operational policy, to store record data obtained by said applying; and
said server (101) verifying a validity of said applied operational policy based on said stored record data,
wherein said record data includes a number of times of condition satisfaction and a number of times of service improvement obtained by said execution, which are obtained by monitoring a change of state of said extracted information system between before and after said execution, and stores therein.

11. The information-system management method according to claim 10, wherein said server performs said operation described in said corresponding operational policy if said extracted information system satisfies said condition described in said corresponding operational policy.

12. The information-system management method according to claim 11, wherein said verification step judges said extracted operational policy as a valid operational policy, if a relationship between said number of times of condition satisfaction and said number of times of improvement satisfies a specific condition.

13. The information-system management method according to claim 10, further comprising the step of said server, upon receiving an operational policy specifying a service to be provided and specifying no service level thereof, storing an operational policy specifying said specified service and a lowest service level among service levels designated for said specified service, wherein if said stored operational policy is judged valid, said server iteratively replaces said stored operational policy by another operational policy specifying said specified service and a service level higher than said lowest service level or previous service level.

14. The information-system management method according to claim 10, further comprising the step of said server reading from said operational-policy storage means a plurality of operational policies specifying a common service and a common service level and judged as valid operational policies by said verification processing, to create at least one new operational policy based on said read operational policies.

15. The information-system management method according to claim 10, further comprising the step of said server creating a new operational policy based on a specific operational policy verified as a valid operational policy by said verification processing, and another operational policy stored in said operational-policy storage means, specifying a service and a service level same as a service and a service level, respectively, specified in said specific operational policy and verified as a valid operational policy by said verification processing.

16. The information-system management method according to claim 15, further comprising the step of said server comparing record data of an operational policy verified as a valid operational policy by said verification processing and record data of said new operational policy created in said policy creation step, to judge whether or not said new operational policy is valid based on result of said comparison.

17. The information-system management method according to claim 14, wherein said policy creation step interchanges at least one of said operation and said condition between a plurality of said operational policies, to create said new operational policy.

18. The information-system management method according to claim 14, wherein said policy creation step uses a common description in at least one of said operation and said condition specified of a plurality of operational policies, to create said new operational policy.

19. A non-transitory computer-readable medium having stored thereon a program for an information-system management unit managing a plurality of information systems for which a service to be provided and a service level specifying a guarantee level of the service are specified, said program, when executed by a processor, allowing said information-system management unit to perform the processing comprising:
storing in operational-policy storage means an operational policy having a description including a service name, a service level, an operation to be performed to resources in said information systems, and a condition for performing the operation;
storing in configuration storage means configuration information including a service name and a service level of each of said information systems;
extracting at least one of said information systems having a service name and a service level corresponding to said service name and said service level of said stored operational policy, by referring to configuration information stored in said configuration storage means;

applying to said extracted information system a corresponding operational policy, to store record data obtained by said applying; and verifying a validity of said applied operational policy based on said stored record data, wherein said record data includes a number of times of condition satisfaction and a number of times of service improvement obtained by said execution, which are obtained by monitoring a change of state of said extracted information system between before and after said execution, and stores therein.

20. The non-transitory computer-readable medium according to claim 19, wherein said information-system management unit is allowed to perform said operation described in said corresponding operational policy if said extracted information system satisfies said condition described in said corresponding operational policy.

21. The non-transitory computer-readable medium according to claim 20, wherein said verification processing judges said extracted operational policy as a valid operational policy, if a relationship between said number of times of condition satisfaction and said number of times of improvement satisfies a specific condition.

22. The non-transitory computer-readable medium according to claim 19, wherein said information-system management unit is further allowed to perform, upon receiving an operational policy specifying a service to be provided and specifying no service level thereof, storing an operational policy specifying said specified service and a lowest service level among service levels designated for said specified service, and iteratively replacing said stored operational policy by another operational policy specifying said specified service and a service level higher than said lowest service level or previous service level if said stored operational policy is judged valid.

23. The non-transitory computer-readable medium according to claim 19, wherein said information-system management unit is further allowed to perform reading from said operational-policy storage means a plurality of operational policies specifying a common service and a common service level and judged as valid operational policies by said verification processing, to create at least one new operational policy based on said read operational policies.

24. The non-transitory computer-readable medium according to claim 19, wherein said information-system management unit is further allowed to perform creating a new operational policy based on a specific operational policy verified as a valid operational policy by said verification processing, and another operational policy stored in said operational-policy storage means, specifying a service and a service level same as a service and a service level, respectively, specified in said specific operational policy and verified as a valid operational policy by said verification processing.

25. The non-transitory computer-readable medium according to claim 24, wherein said information-system management unit is further allowed to perform comparing record data of an operational policy verified as a valid operational policy by said verification processing and record data of said new operational policy, to judge whether or not said new operational policy is valid based on result of said comparison.

26. The non-transitory computer-readable medium according to claim 24, wherein said policy creation processing interchanges at least one of said operation and said condition between a plurality of said operational policies, to create said new operational policy.

27. The non-transitory computer-readable medium according to claim 24, wherein said policy creation processing uses a common description in at least one of said operation and said condition specified of a plurality of operational policies, to create said new operational policy.

\* \* \* \* \*